(12) United States Patent
Honda et al.

(10) Patent No.: US 11,818,475 B2
(45) Date of Patent: Nov. 14, 2023

(54) DATA PROCESSING DEVICE, DATA PROCESSING METHOD, AND PROGRAM

(71) Applicants: SONY SEMICONDUCTOR SOLUTIONS CORPORATION, Kanagawa (JP); SONY CORPORATION, Tokyo (JP)

(72) Inventors: Motonari Honda, Kanagawa (JP); Shun Kaizu, Tokyo (JP)

(73) Assignees: Sony Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/276,257

(22) PCT Filed: Sep. 27, 2019

(86) PCT No.: PCT/JP2019/038112
§ 371 (c)(1),
(2) Date: Mar. 15, 2021

(87) PCT Pub. No.: WO2020/067410
PCT Pub. Date: Apr. 2, 2020

(65) Prior Publication Data
US 2022/0030185 A1 Jan. 27, 2022

(30) Foreign Application Priority Data

Sep. 28, 2018 (JP) .................................. 2018-184639
Jan. 18, 2019 (JP) .................................. 2019-006852

(51) Int. Cl.
*H04N 25/47* (2023.01)
*H04N 25/707* (2023.01)
(Continued)

(52) U.S. Cl.
CPC ........... *H04N 25/443* (2023.01); *H04N 25/50* (2023.01); *H04N 25/47* (2023.01); *H04N 25/707* (2023.01)

(58) Field of Classification Search
CPC .............................. H04N 25/47; H04N 25/707
(Continued)

(56) References Cited

U.S. PATENT DOCUMENTS 10,198,660 B2 * 2/2019 Ji ........................... G06V 10/60
10,466,779 B1 * 11/2019 Liu ....................... H04N 5/2256
(Continued)

FOREIGN PATENT DOCUMENTS

| JP | 2010-510732 | 4/2010 |
| JP | 2012-257193 | 12/2012 |
| JP | 2018-509847 | 4/2018 |

OTHER PUBLICATIONS

International Search Report prepared by the Japan Patent Office dated Dec. 4, 2019, for International Application No. PCT/JP2019/038112.

*Primary Examiner* — Anthony J Daniels
(74) *Attorney, Agent, or Firm* — Sheridan Ross PC

(57) ABSTRACT

The present technology relates to image data processing devices, image data processing methods, and programs. A frame data generation unit generates first frame data based on event data indicating a variation in an electrical signal of a pixel generating the electrical signal by performing photoelectric conversion during a first accumulation time from a first frame generation start time to a first frame generation end time, and second frame data based on event data occurring during a second accumulation time from a second frame generation start time to a second frame generation end time. A first frame period from the first frame generation start time to the second frame generation start time is set and supplied to the frame data generation unit. The present
(Continued)

technology can be applied to, for example, a case where a frame data is generated from an event data output from a dynamic vision sensor (DVS).

28 Claims, 32 Drawing Sheets

(51) Int. Cl.
*H04N 25/443* (2023.01)
*H04N 25/50* (2023.01)

(58) Field of Classification Search
USPC .......................................................... 348/294
See application file for complete search history.

(56) References Cited

U.S. PATENT DOCUMENTS

| | | |
|---|---|---|
| 10,600,189 B1 * | 3/2020 | Bedikian ................... G06T 7/73 |
| 10,812,711 B2 * | 10/2020 | Sapienza ................. G06K 9/628 |
| 10,887,535 B2 * | 1/2021 | Kubendran ............ H04N 5/341 |
| 10,992,887 B2 * | 4/2021 | Movshovich ........ H04N 5/3454 |
| 2010/0182468 A1 | 7/2010 | Posch et al. |
| 2012/0287294 A1 | 11/2012 | Kaizu et al. |
| 2014/0313400 A1 | 10/2014 | Kaizu et al. |
| 2016/0078321 A1 * | 3/2016 | Wang ..................... G06V 10/10 |
| | | 382/103 |
| 2018/0063449 A1 | 3/2018 | Sio-Hoi et al. |
| 2018/0098082 A1 * | 4/2018 | Burns ................... H04N 19/54 |
| 2018/0262705 A1 * | 9/2018 | Park ................. H04N 5/37455 |
| 2019/0289230 A1 * | 9/2019 | Berner ................... H04N 5/379 |
| 2020/0134827 A1 * | 4/2020 | Saha ................. G06F 18/2431 |

\* cited by examiner

FIG. 25

|  | FRAME INTERVAL (FRAME PERIOD) | FRAME WIDTH (ACCUMULATION TIME) |
|---|---|---|
| THIRD SETTING WAY | TIME | TIME |
| FOURTH SETTING WAY | TIME | NUMBER OF EVENT DATA |
| FIFTH SETTING WAY | NUMBER OF EVENT DATA | TIME |
| SIXTH SETTING WAY | NUMBER OF EVENT DATA | NUMBER OF EVENT DATA |

DATA PROCESSING DEVICE, DATA PROCESSING METHOD, AND PROGRAM

CROSS REFERENCE TO RELATED APPLICATIONS

This application is a national stage application under 35 U.S.C. 371 and claims the benefit of PCT Application No. PCT/JP2019/038112, having an international filing date of 27 Sep. 2019, which designated the United States, which PCT application claimed the benefit of Japanese Patent Application Nos. 2018-184639, filed 28 Sep. 2018 and 2019-006852, filed 18 Jan. 2019, the entire disclosures of each of which are incorporated herein by reference.

TECHNICAL FIELD

The present technology relates to data processing devices, data processing methods, and programs, in particular, the present technology relates to a data processing device, data processing method, and program, capable of obtaining appropriate frame data in generating the frame data, which is image data in a frame format, in one example, depending on event data indicating the event's occurrence that causes variation in electrical signals of a pixel.

BACKGROUND ART

Image sensors are being developed that output event data indicating the event's occurrence in generating the event assuming variation in pixel luminance as the event. In this regard, an image sensor, which captures an image in synchronization with a vertical synchronization signal and outputs frame data that is image data in a frame format, can be referred to as a synchronous image sensor. On the other hand, the image sensor that outputs the event data does not output the event data in synchronization with the vertical synchronization signal. Thus, it can be referred to as an asynchronous image sensor. The asynchronous image sensor is called, for example, a dynamic vision sensor (DVS).

It is difficult to use the event data output by DVS for existing image processing without any modification, so the event data is converted into frame data and is used for image processing. As a way of converting event data into frame data, that is, a way of generating frame data depending on the event data, a way of aggregating event data over a specific time period into a frame or aggregating the specific number of event data into a frame is developed (see, e.g., Patent Document 1).

CITATION LIST

Patent Document

Patent Document 1: Japanese Unexamined Patent Application Publication No. 2017-530467

SUMMARY OF THE INVENTION

Problems to be Solved by the Invention

In generating frame data that is image data in a frame format, it is desirable to obtain appropriate frame data for subsequent image processing and the like depending on the event data.

The present technology is made in view of such a situation and intends to be capable of obtaining appropriate frame data.

Solutions to Problems

A first data processing device according to the present technology includes a frame data generation unit configured to generate first frame data and second frame data, the first frame data being based on event data indicating a variation in an electrical signal of a pixel generating the electrical signal by performing photoelectric conversion, the event data occurring during a first accumulation time from a first frame generation start time to a first frame generation end time, and the second frame data being based on event data occurring during a second accumulation time from a second frame generation start time to a second frame generation end time, and a frame period setting unit configured to set and supply a first frame period to the frame data generation unit, the first frame period being a period from the first frame generation start time to the second frame generation start time.

The first data processing device according to the present technology generates first frame data and second frame data, the first frame data being based on event data indicating a variation in an electrical signal of a pixel generating the electrical signal by performing photoelectric conversion, the event data occurring during a first accumulation time from a first frame generation start time to a first frame generation end time, and the second frame data being based on event data occurring during a second accumulation time from a second frame generation start time to a second frame generation end time. In addition, a first frame period being a period from the first frame generation start time to the second frame generation start time is set and supplied to the frame data generation unit.

A second data processing device or a first program according to the present technology is a data processing device including a frame data generation unit configured to generate frame data on the basis of event data indicating a variation in an electrical signal of a pixel generating the electrical signal by performing photoelectric conversion, the event data occurring during an accumulation time from a frame generation start time to a frame generation end time, and a frame period setting unit configured to set and supply a frame period indicating an interval between a frame data generation start time of first frame data and a frame data generation start time of second frame data to the frame data generation unit, the second frame data being generated consecutively with the first frame data, or a program for causing a computer to function as such a data processing device.

A first data processing method according to the present technology is a data processing method including generating, by a frame data generation unit, frame data on the basis of event data indicating a variation in an electrical signal of a pixel generating the electrical signal by performing photoelectric conversion, the event data occurring during an accumulation time from a frame generation start time to a frame generation end time, and setting and supplying a frame period indicating an interval between a frame data generation start time of first frame data and a frame data generation start time of second frame data to the frame data generation unit, the second frame data being generated consecutively with the first frame data.

The second data processing device, the first data processing method, and the first program according to the present technology generates frame data on the basis of event data indicating a variation in an electrical signal of a pixel generating the electrical signal by performing photoelectric conversion, the event data occurring during an accumulation time from a frame generation start time to a frame generation end time. In addition, a frame period indicating an interval between a frame data generation start time of first frame data and a frame data generation start time of second frame data, the second frame data being generated consecutively with the first frame data is set and supplied to the frame data generation unit.

A third data processing device or a second program according to the present technology is a data processing device including a frame data generation unit configured to generate first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time, or a program for causing a computer to function as such a data processing device.

A second data processing method according to the present technology is a data processing method including generating first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time.

The third data processing device, the second data processing method, and the second program according to the present technology generates first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time.

A fourth data processing device according to the present technology is a data processing device for generating frame data on the basis of event data indicating a variation in an electrical signal of a pixel generating the electrical signal by performing photoelectric conversion, the event data occurring during an accumulation time from a frame generation start time to a frame generation end time, in which a number of the frame data to be generated per unit time varies depending on a number of the event data per unit time.

The fourth data processing device according to the present technology generates frame data on the basis of event data indicating a variation in an electrical signal of a pixel generating the electrical signal by performing photoelectric conversion, the event data occurring during an accumulation time from a frame generation start time to a frame generation end time. A number of the frame data to be generated per unit time varies depending on a number of the event data per unit time.

A fifth data processing device according to the present technology is a data processing device including a data processing unit including, an event generation unit having a pixel generating an electrical signal by performing photoelectric conversion, configured to generate event data representing occurrence of an event indicating a variation in the electrical signal of the pixel, a frame data generation unit configured to generate frame data on the basis of the event data occurring during an accumulation time from a frame generation start time to a frame generation end time, and a frame period setting unit configured to set and supply a frame period indicating an interval between a frame data generation start time of first frame data and a frame data generation start time of second frame data to the frame data generation unit, the second frame data being generated consecutively with the first frame data.

A third data processing method according to the present technology is a data processing method including generating event data representing occurrence of an event indicating a variation in an electrical signal of a pixel generating the electrical signal by performing photoelectric conversion, generating frame data on the basis of the event data occurring during an accumulation time from a frame generation start time to a frame generation end time, and setting and supplying a frame period indicating an interval between a frame data generation start time of first frame data and a frame data generation start time of second frame data to the frame data generation unit, the second frame data being generated consecutively with the first frame data.

The fifth data processing device and the third data processing method according to the present technology generates, by a frame data generation unit, event data representing occurrence of an event indicating a variation in an electrical signal of a pixel generating the electrical signal by performing photoelectric conversion, and generates frame data on the basis of the event data occurring during an accumulation time from a frame generation start time to a frame generation end time. In addition, a frame period indicating an interval between a frame data generation start time of first frame data and a frame data generation start time of second frame data, the second frame data being generated consecutively with the first frame data is set and supplied to the frame data generation unit.

The data processing device can be an independent unit or device or an internal block included in a single unit. In addition, the data processing device can be configured as a one-chip semiconductor chip or module.

It is possible to deliver the program by transmitting it via a transmission medium or by recording it on a recording medium.

BRIEF DESCRIPTION OF DRAWINGS

FIG. 25 is a diagram illustrating a list of setting ways of setting an inter-frame interval and a frame width.

MODE FOR CARRYING OUT THE INVENTION

<An Embodiment of a Data Processing Chip to which the Present Technology is Applied>

Figure 1:
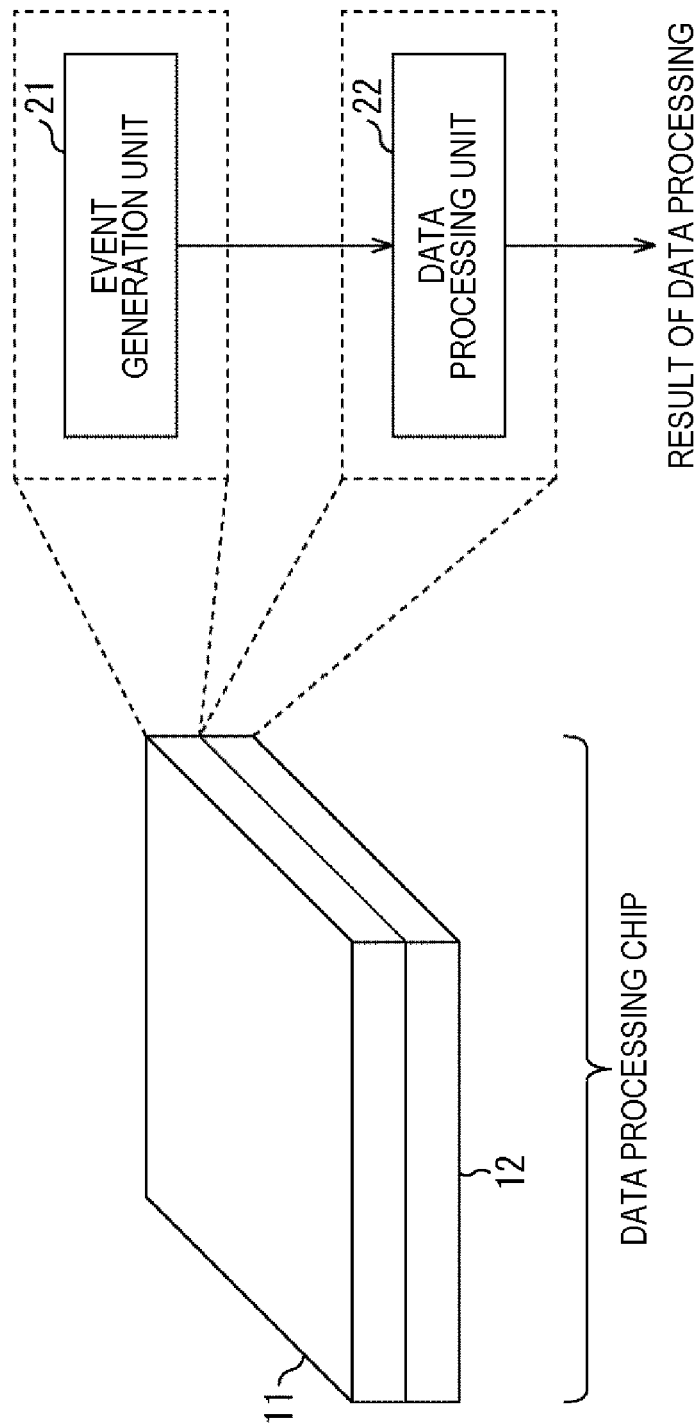
FIG. 1 is a diagram illustrating an exemplary configuration of an embodiment of a data processing chip to which the present technology is applied.

FIG. 1 is a diagram illustrating an exemplary configuration of an embodiment of a data processing chip to which the present technology is applied.

The data processing chip is a one-chip semiconductor chip and includes a plurality of dies (substrates), that is, a sensor die (substrate) 11 and a logic die 12 arranged on top of each other. Moreover, the data processing chip can include one die or three or more dies arranged on top of each other.

In the data processing chip illustrated in FIG. 1, the sensor die 11 includes an event generation unit 21 (a circuit thereof), and the logic die 12 includes a data processing unit 22. Moreover, it is possible to include a part of the event generation unit 21 in the logic die 12. It is also possible to include a part of the data processing unit 22 in the sensor die 11.

The event generation unit 21 has pixels that generate an electrical signal by performing photoelectric conversion on the incident light and generates event data representing the event's occurrence that is variation in electrical signals of the pixel. The event generation unit 21 supplies the event data to the data processing unit 22. In other words, the event generation unit 21 performs image-capturing that generates an electrical signal by performing photoelectric conversion on the incident light for the pixel, in one example, similarly to the synchronous image sensor. However, the event generation unit 21 does not generate the image data in the frame format, but generates the image data in the frame format and also generates the event data representing the event's occurrence that is variation in electrical signals of the pixel.

The data processing unit 22 performs data processing depending on the event data supplied from the event generation unit 21 and outputs a data processing result that is the result of the data processing.

Figure 2:
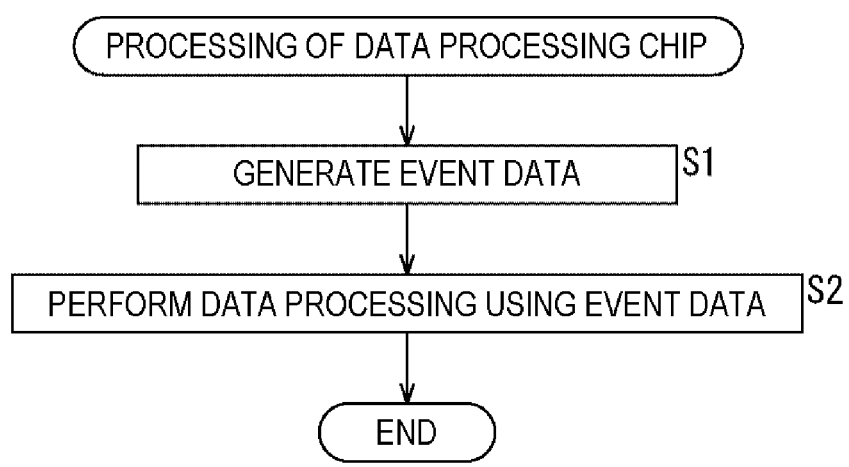
FIG. 2 is a flowchart illustrated to describe the operation of a data processing chip.

FIG. 2 is a flowchart illustrated to describe the operation of a data processing chip in FIG. 1.

In step S1, if variation in the pixel's electrical signals as an event occurs, the event generation unit 21 generates and supplies event data to the data processing unit 22.

In step S2, the data processing unit 22 performs data processing that converts the event data into frame data depending on the event data supplied from the event generation unit 21, that is, data processing such as the generation of frame data. Then, the data processing unit 22 outputs a result obtained by the data processing.

<Exemplary Configuration of Event Generation Unit 21>

Figure 3:
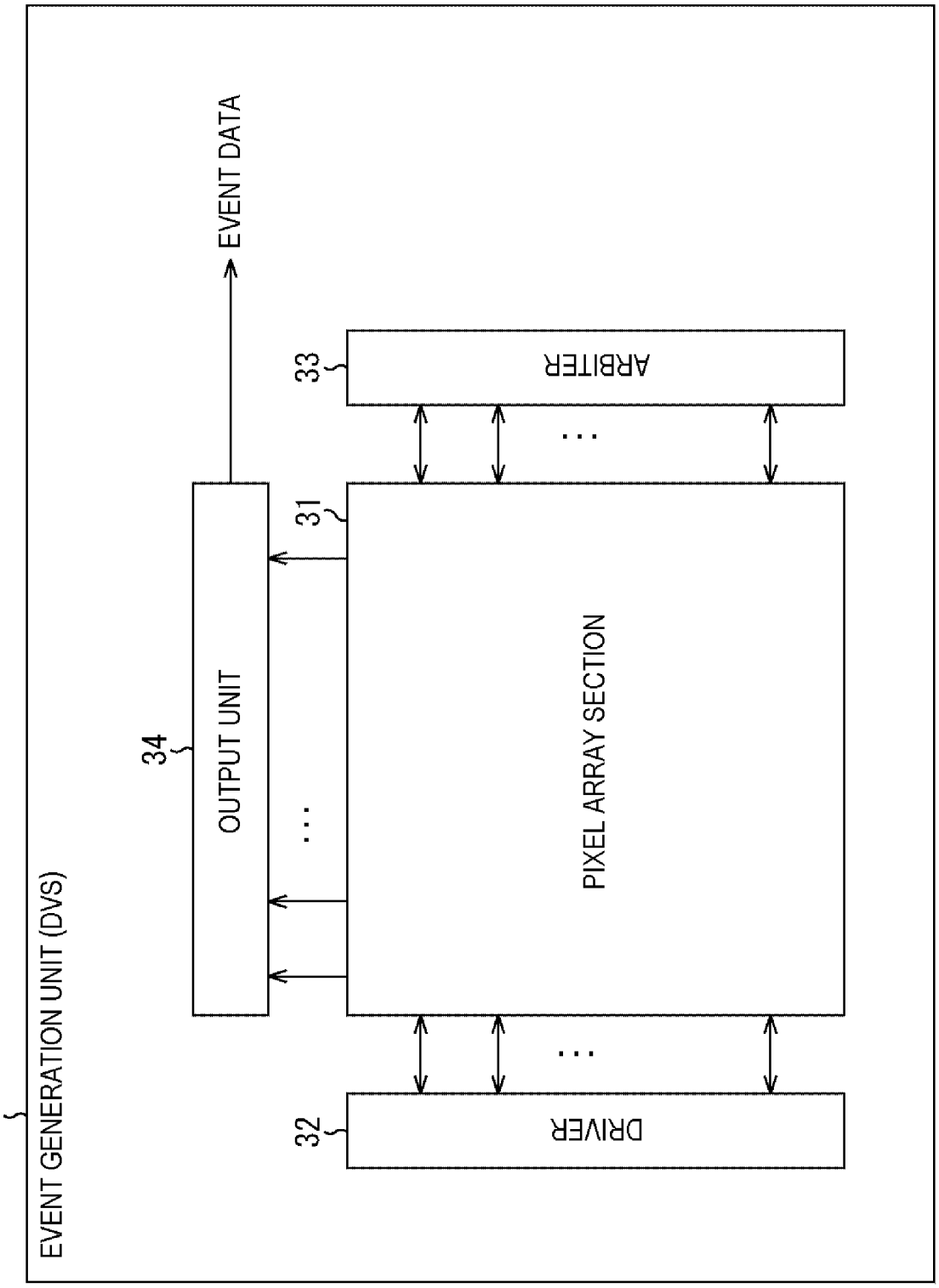
FIG. 3 is a block diagram illustrating an exemplary configuration of an event generation unit 21.

FIG. 3 is a block diagram illustrating an exemplary configuration of an event generation unit 21 in FIG. 1.

The event generation unit 21 includes a pixel array section 31, a driver 32, an arbiter 33, and an output unit 34.

The pixel array section 31 includes a plurality of pixels arranged in a two-dimensional grid pattern therein. In addition, the pixel array section 31 includes a plurality of divided pixel blocks, each of which has a predetermined number of pixels. A set of pixels or pixel blocks arranged in the horizontal direction is referred to as a "row" and a set of pixels or pixel blocks arranged in a direction perpendicular to the row is referred to as a "column".

In the case where variation exceeding a predetermined threshold occurs in the photocurrent acting as an electrical signal generated by photoelectric conversion for a pixel, the pixel block detects the variation in the photocurrent as an event. In detecting an event, the pixel block outputs, to the arbiter 33, a request requesting output of the event data indicating the event's occurrence.

The driver 32 supplies a control signal to the pixel array section 31 to drive the pixel array section 31.

The arbiter 33 arbitrates the request from the pixel blocks included in the pixel array section 31 and replies to the pixel block with a response indicating approval or disapproval of the output of the event data. The pixel block, when receiving the response indicating the approval to the output of the event data, outputs the event data to the output unit 34.

The output unit 34 performs necessary processing on the event data output by the pixel blocks included in the pixel array section 31 and supplies the resultant to the data processing unit 22 (FIG. 1).

In this description, the photocurrent variation as electrical signals of a pixel can be regarded as the variation in pixel's luminance. Thus, the event can also be said to be the variation in pixel's luminance (the variation in brightness exceeding a threshold).

The event data indicating the event's occurrence includes at least position information (such as coordinates) indicating a pixel block position in which the luminance variation as an event occurs. In addition, the event data can include a polarity (positive or negative) of the luminance variation.

For the series of event data being output at the timing when the event occurs from the pixel block, as long as the interval between the event data items is kept as it was when the event occurred, it can be said that the event data implicitly includes time information indicating the time (relative time) when the event occurred. However, if the interval between the event data items is not kept as it is upon the event's occurrence due to the event data being stored in the memory or the like, the time information implicitly included in the event data will be lost. Thus, the output unit 34 includes, in the event data, time information such as a timestamp indicating the time (relative time) when the event occurs before the interval between the event data items is not kept as it was when the event occurred. The processing of including the time information in the event data can be performed in any block other than the output unit 34 before the time information implicitly included in the event data is lost.

<Exemplary Configuration of Pixel Array Section 31>

Figure 4:
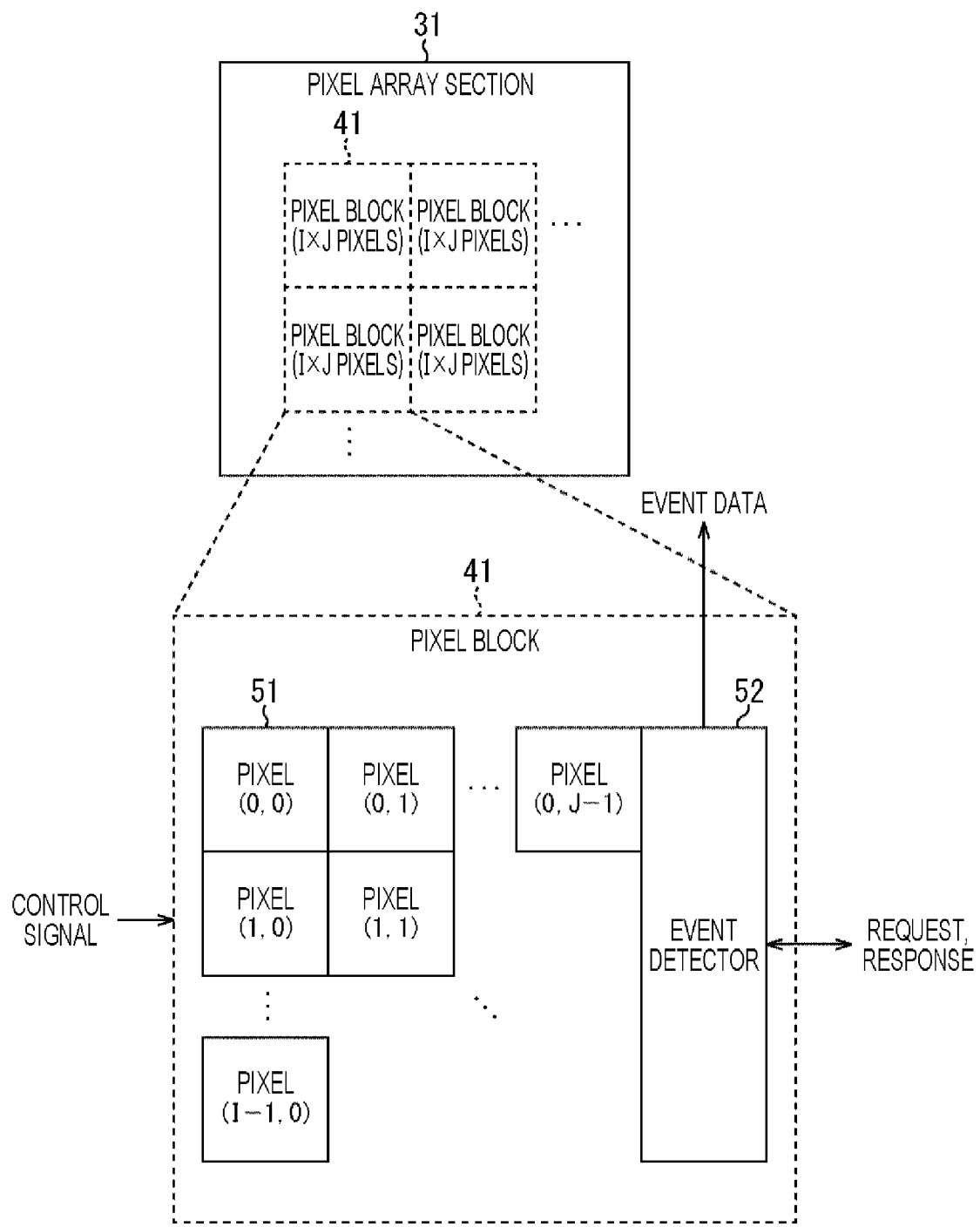
FIG. 4 is a block diagram illustrating an exemplary configuration of the pixel array section 31.

FIG. 4 is a block diagram illustrating an exemplary configuration of the pixel array section 31 in FIG. 3.

The pixel array section 31 has a plurality of pixel blocks 41. The pixel block 41 includes a plurality (I×J) of pixels 51 arranged in I rows and J columns (where I and J are integers), and an event detector 52. The plurality of pixels 51 in the pixel block 41 shares the event detector 52.

The pixel 51 receives the incident light from a subject and performs photoelectric conversion to generate a photocurrent as an electrical signal. The pixel 51 supplies the photocurrent to the event detector 52 under the control of the driver 32.

The event detector 52 detects a variation in the photocurrent from each of the pixels 51 that exceeds a predetermined threshold as an event. The event detector 52, when detecting an event, supplies the arbiter 33 with a request for outputting event data indicating the event's occurrence. Then, the event detector 52, when receiving, from the arbiter 33, a response to permit the output of the event data as a response to the request, outputs the event data to the output unit 34.

<Exemplary Configuration of Pixel 51>

Figure 5:
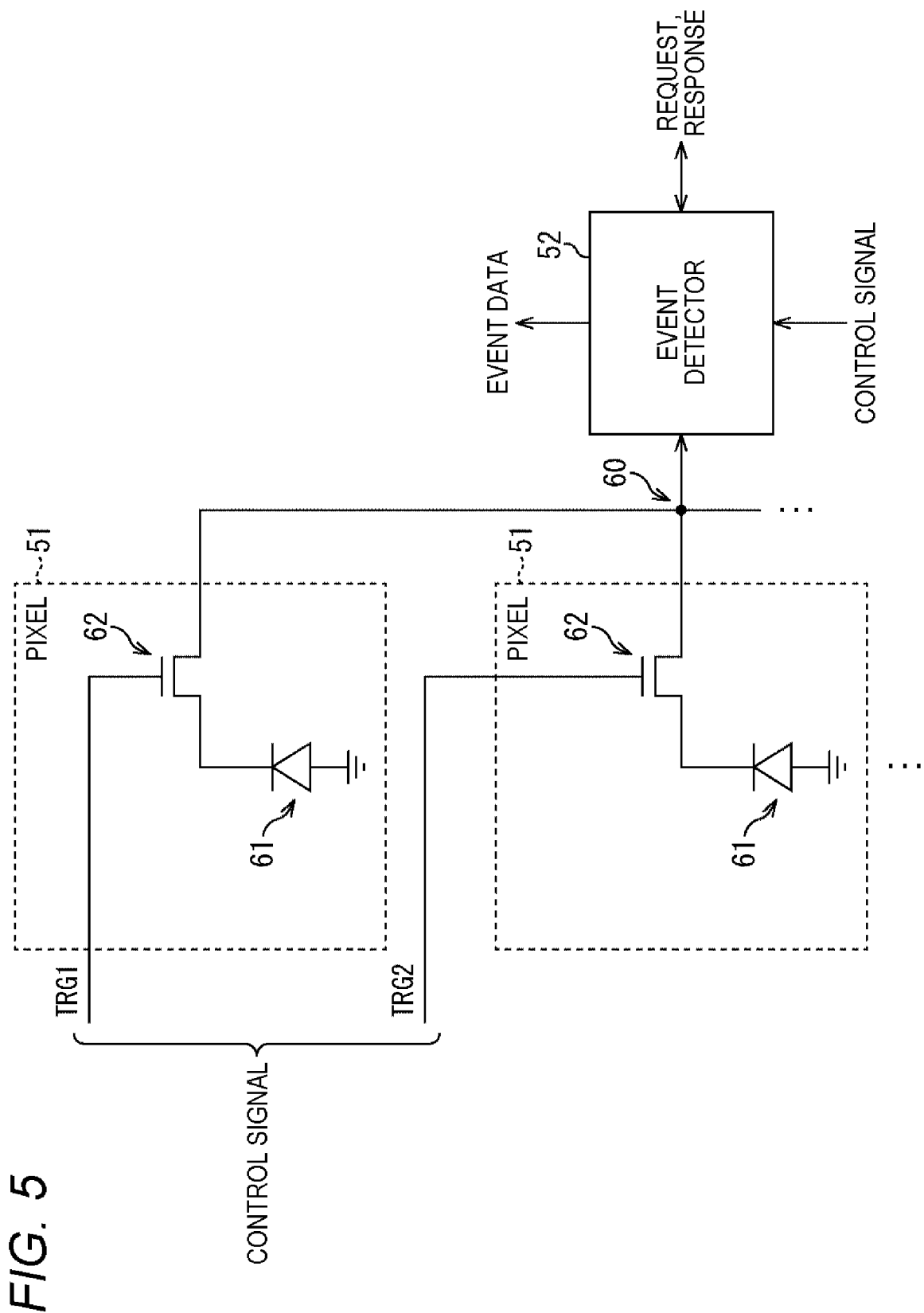
FIG. 5 is a circuit diagram illustrating an exemplary configuration of a pixel 51.

FIG. 5 is a circuit diagram illustrating an exemplary configuration of a pixel 51 in FIG. 4.

The pixel 51 includes a photoelectric transducer 61 and a transfer transistor 62.

The photoelectric transducer 61 includes, in one example, a photodiode (PD). The photoelectric transducer 61 receives incident light and performs photoelectric conversion to generate an electric charge.

The transfer transistor 62 includes, in one example, a negative type metal-oxide-semiconductor field-effect transistor (N-type MOS FET). The transfer transistor 62 included in the n-th pixel 51 of the pixels 51 of I rows and J columns forming the pixel block 41 is turned on/off in accordance with a control signal TRGn supplied from the driver 32 (FIG. 3). Turning on the transfer transistor 62 causes the electric charge generated by the photoelectric transducer 61 to be transferred (supplied) to the event detector 52 as a photocurrent.

The pixels 51 of I rows and J columns forming the pixel block 41 are connected to the event detector 52 included in the pixel block 41 via a node 60. Thus, the photocurrent generated by the pixel 51 (the photoelectric transducer 61 thereof) is supplied to the event detector 52 via the node 60. Consequently, the event detector 52 is supplied with the sum of photocurrents of all the pixels 51 in the pixel block 41.

The event detector 52 drives in accordance with a row drive signal as a control signal from the driver 32 (FIG. 3) and detects variation as an event in the photocurrents (sum thereof) supplied from the pixel 51. The event detector 52, when detecting variation as an event in the photocurrents, i.e., luminance variation, outputs the event data indicating the event's occurrence.

In this description, the event detector 52, when detecting an event, is capable of outputting a voltage corresponding to the photocurrent supplied from the pixel 51 as a pixel signal corresponding to the incident light that is incident on the pixel 51 separately from the event data. Turning on the transfer transistors 62 of the plurality of pixels 51 at the same time enables the sum of the pixel signals of the plurality of pixels 51 to be output as the output of the pixel signals. In addition, sequentially turning on the transfer transistors 62 of the pixels 51 included in the pixel block 41 makes it possible to output a pixel signal for each pixel 51. In the case of outputting the pixel signal of the pixel 51, an A-to-D converter configured to perform analog-to-digital conversion on the pixel signal is provided in the event generation unit 21.

As illustrated in FIG. 4, the pixel block 41 having the plurality of pixels 51 that shares the event detector 52 makes it possible to reduce the number of event detectors 52 compared with the case where one event detector 52 is provided for one pixel 51. Thus, it is possible to reduce the size of the pixel array section 31.

Moreover, the pixel block 41 can include one pixel 51 rather than a plurality of pixels 51.

<Exemplary Configuration of Event Detector 52>

Figure 6:
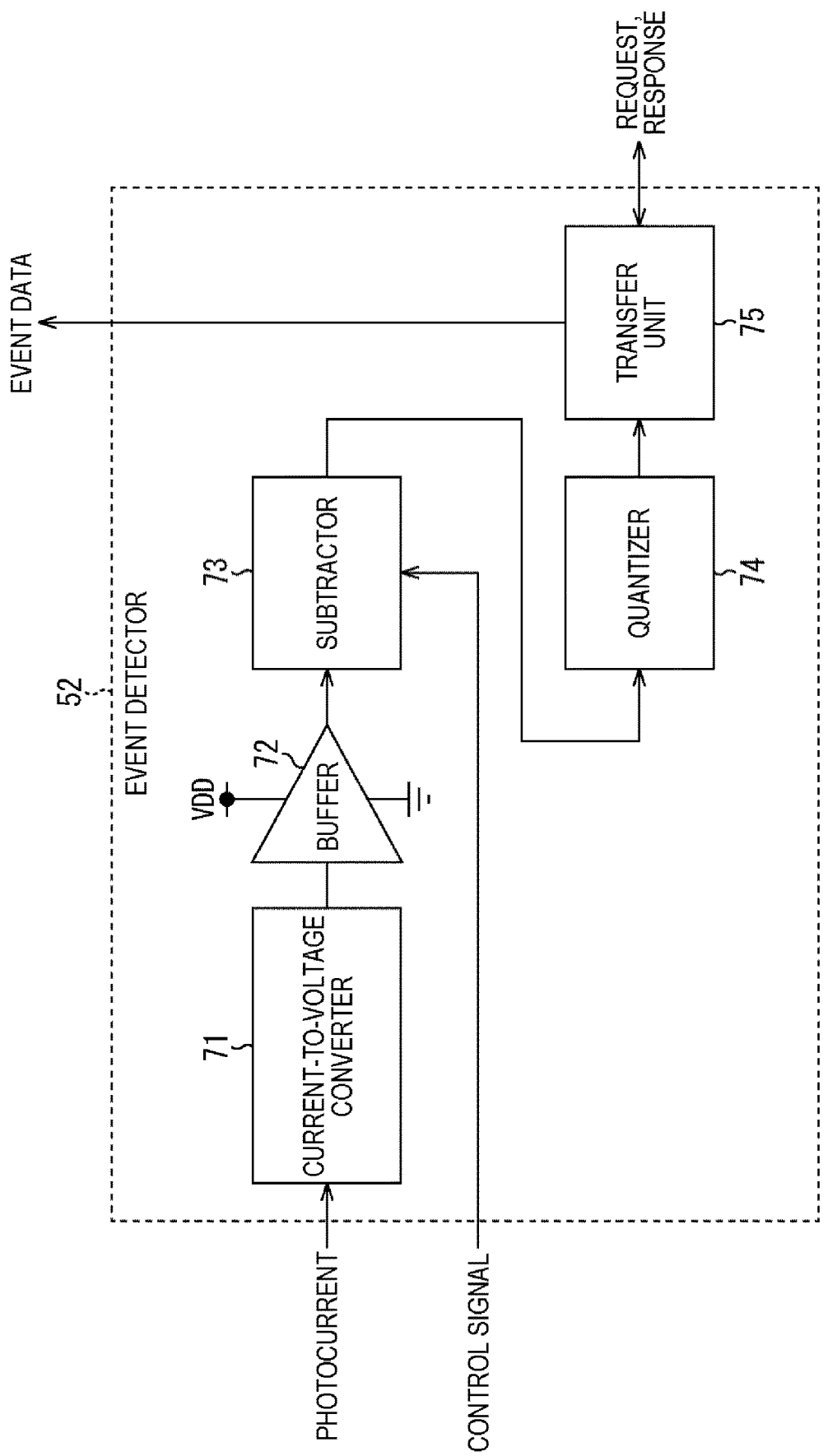
FIG. 6 is a block diagram illustrating an exemplary configuration of an event detector 52.

FIG. 6 is a block diagram illustrating an exemplary configuration of an event detector 52 in FIG. 4.

The event detector 52 includes a current-to-voltage converter 71, a buffer 72, a subtractor 73, a quantizer 74, and a transfer unit 75.

The current-to-voltage converter 71 converts the photocurrent (sum thereof) from the pixel 51 into a voltage corresponding to a logarithm of the photocurrent (also hereinafter referred to as photovoltage) and supplies it to the buffer 72.

The buffer 72 performs buffering (correction) on the photovoltage from the current-to-voltage converter 71 and supplies it to the subtractor 73.

The subtractor 73 calculates a difference value between the present photovoltage and a photovoltage at timing different from the current time by a tiny time and supplies a difference signal corresponding to the difference value to the quantizer 74. This calculation is performed at the timing in accordance with a row drive signal used as the control signal from the driver 32.

The quantizer 74 quantizes the difference signal from the subtractor 73 into a digital signal and supplies the quantized value of the difference signal to the transfer unit 75.

The transfer unit 75 transfers (outputs) the event data to the output unit 34 depending on the quantized value of the difference signal from the quantizer 74. Specifically, the transfer unit 75 supplies the arbiter 33 with a request for outputting the event data. Then, the transfer unit 75, when receiving, from the arbiter 33, a response to permit the output of the event data as a response to the request, outputs the event data to the output unit 34.

<Exemplary Configuration of Current-to-Voltage Converter 71>

Figure 7:
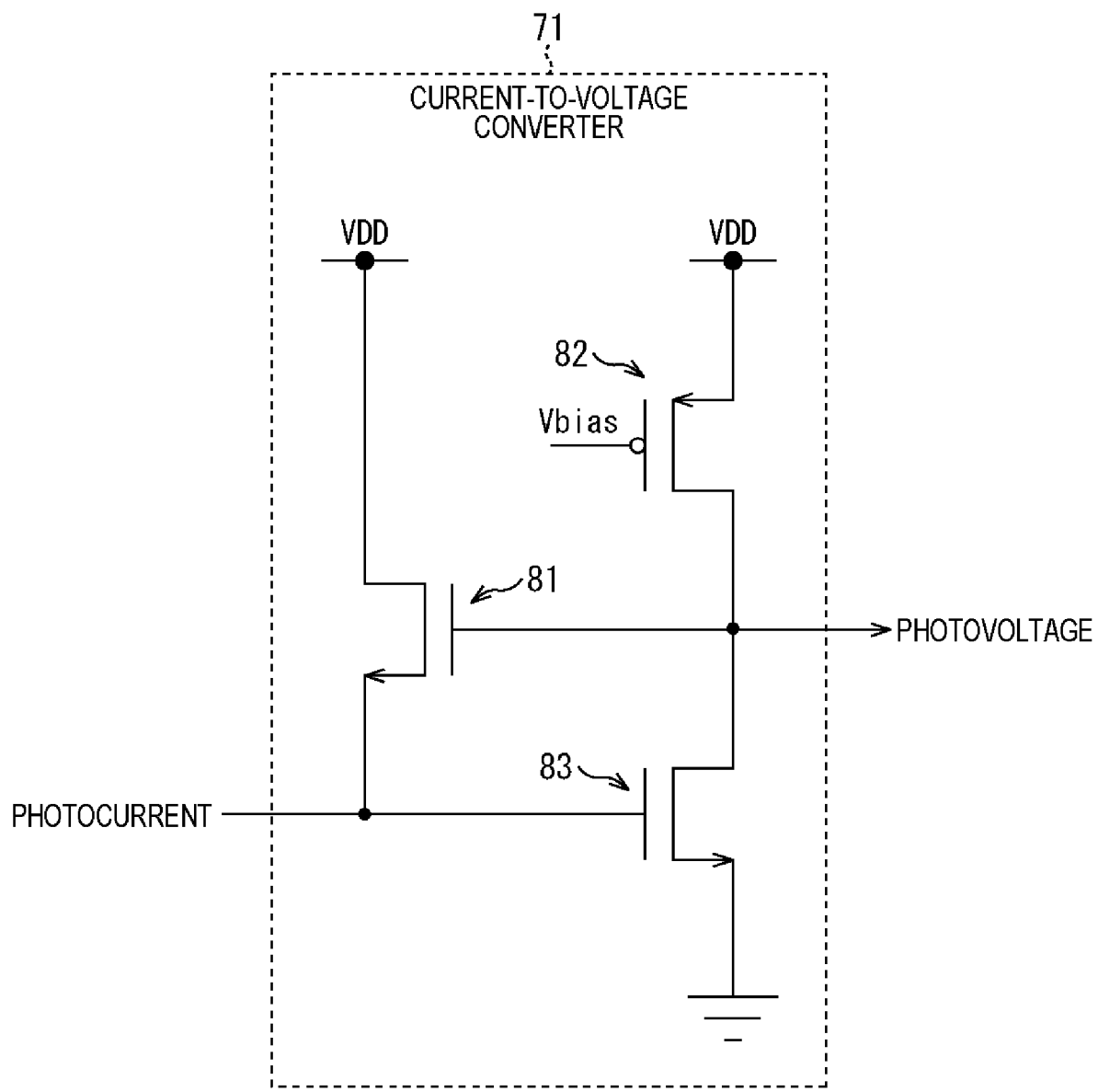
FIG. 7 is a circuit diagram illustrating an exemplary configuration of a current-to-voltage converter 71.

FIG. 7 is a circuit diagram illustrating an exemplary configuration of a current-to-voltage converter 71 in FIG. 6.

The current-to-voltage converter 71 includes transistors 81 to 83. It is possible to employ an N-type MOS FET as an example of the transistors 81 and 83 and a P-type MOS FET as an example of the transistor 82.

The transistor 81 has the source connected to the gate of the transistor 83, and the photocurrent from the pixel 51 is supplied to the connection point between the source of the transistor 81 and the gate of the transistor 83. The transistor 81 has the drain connected to the power supply VDD and has the gate connected to the drain of the transistor 83.

The transistor 82 has the source connected to the power supply VDD and has the drain connected to the connection point between the gate of the transistor 81 and the drain of the transistor 83. A predetermined bias voltage V bias is applied to the gate of the transistor 82. The transistor 82 supplies a constant current to the transistor 83.

The transistor 83 has the source grounded.

In the current-to-voltage converter 71, the transistor 81 is connected to the power supply VDD and acts as a source follower. The photocurrent from the pixel 51 is converted into a photovoltage corresponding to the logarithm of the photocurrent by the transistor 81 acting as the source follower and the transistor 83 having the gate connected to the source of the transistor 81.

The photovoltage is supplied to the buffer 72 (FIG. 6) from the connection point between the gate of the transistor 81 and the drain of the transistor 83.

<Exemplary Configuration of Subtractor 73 and Quantizer 74>

Figure 8:
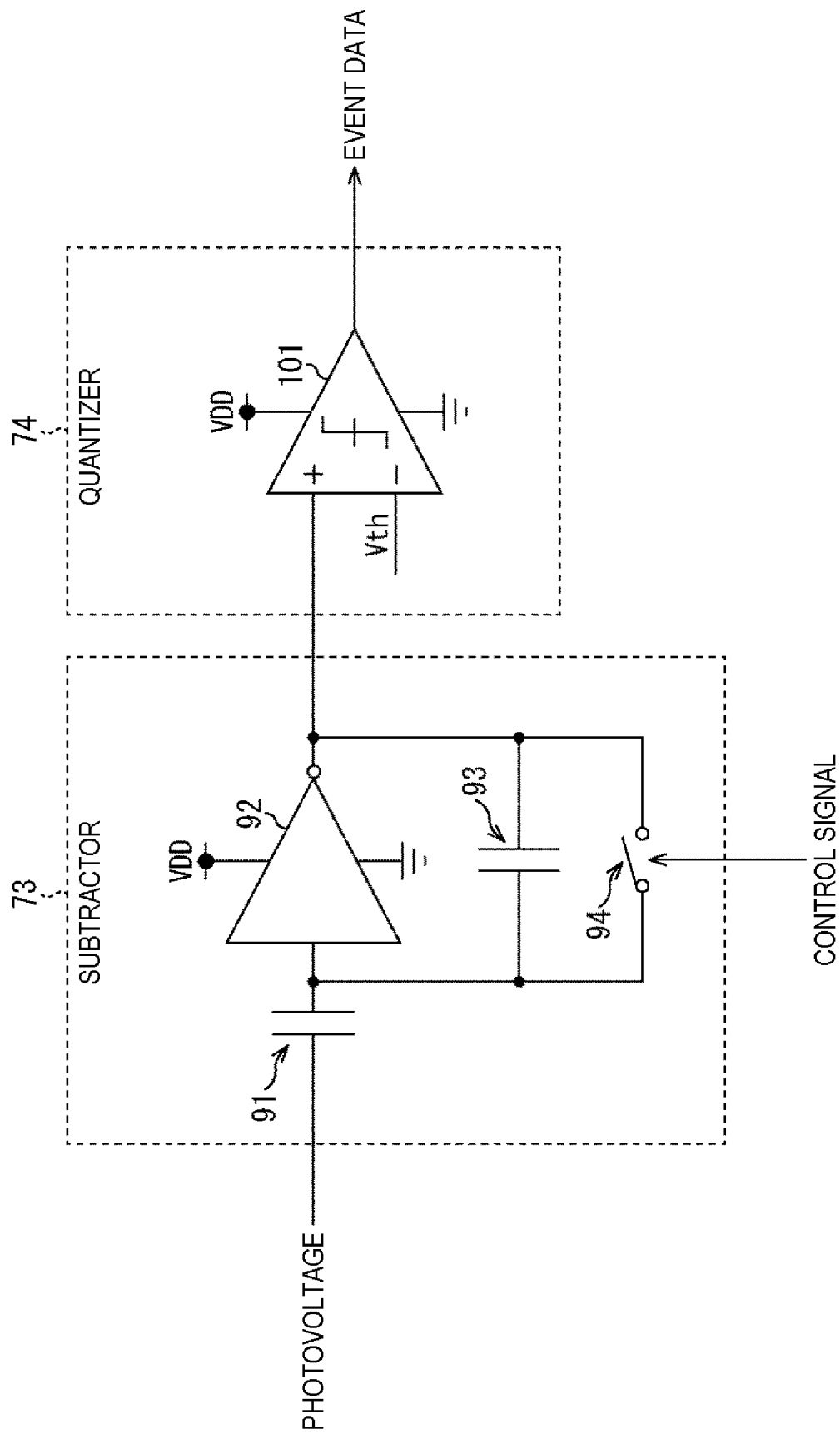
FIG. 8 is a circuit diagram illustrating an exemplary configuration of a subtractor 73 and a quantizer 74.

FIG. 8 is a circuit diagram illustrating an exemplary configuration of a subtractor 73 and a quantizer 74 in FIG. 6.

The subtractor 73 includes a capacitor 91, an operational amplifier 92, a capacitor 93, and a switch 94. The quantizer 74 includes a comparator 101.

The capacitor 91 has one end connected to the output terminal of the buffer 72 (FIG. 6) and the other end connected to the input terminal of the operational amplifier 92.

The operational amplifier 92 has the output terminal connected to the non-inverting input terminal (+) of the comparator 101.

The capacitor 93 has one end connected to the input terminal of the operational amplifier 92 and the other end connected to the output terminal of the operational amplifier 92.

The switch 94 is connected to the capacitor 93 to turn on/off the connection to both ends of the capacitor 93. The switch 94 turns on/off the connection to both ends of the capacitor 93 by turning on/off in accordance with the row drive signal used as the control signal from the driver 32.

The connection point between the capacitor 91 and the operational amplifier 92 is virtually grounded, and the potential of this virtual ground is set to zero for convenience sake.

Assuming that the photovoltage on the side of the buffer 72 (FIG. 6) of the capacitor 91 upon turning on the switch 94 is Vinit and the capacitance of the capacitor 91 is C1, the electric charge Qinit accumulated in the capacitor 91 upon turning on the switch 94 is expressed by the following formula. On the other hand, both ends of the capacitor 93 are short-circuited upon turning on the switch 94, so the electric charge accumulated in the capacitor 93 is zero.

$$Q\text{init}=C1\times V\text{init} \qquad (1)$$

Then, assuming that the switch 94 is turned off and the photovoltage on the side of the buffer 72 (FIG. 6) of the capacitor 91 at that point is Vafter, the electric charge Qafter accumulated in the capacitor 91 is expressed by the following formula.

$$Q\text{after}=C1\times V\text{after} \qquad (2)$$

On the other hand, assuming that the capacitance of the capacitor 93 is C2 and the output voltage of the operational amplifier 92 is Vout, the electric charge Q2 stored in the capacitor 93 is expressed by the following formula.

$$Q2=C2\times V\text{out} \qquad (3)$$

The total amount of charge, which is the sum of the electric charge of the capacitor 91 and the electric charge of the capacitor 93, does not vary before and after turning off the switch 94, so the following formula is obtained.

$$Q\text{init}=Q\text{after}+Q2 \qquad (4)$$

The following formula is obtained by substituting Formulas (1) to (3) with Formula (4) and transforming it.

$$V\text{out}=-(C1/C2)\times(V\text{after}-V\text{init}) \qquad (5)$$

Formula (5) shows that, in the subtractor 73, the subtraction between photovoltages Vafter and Vinit is performed, specifically, a difference signal (Vout) corresponding to the difference Vafter-Vinit between the photovoltages Vafter and Vinit is calculated. From Formula (5), the subtraction gain of the subtractor 73 is C1/C2. It is typically desired to maximize the gain, so it is preferable to design C1 to be large and C2 to be small. On the other hand, if C2 is too small, kT/C noise is likely to increase, causing noise characteristics to deteriorate. Thus, the reduction in the capacity of C2 is limited to a tolerable noise range. In addition, the event detector 52 having the subtractor 73 is provided for each pixel block 41, so the capacitances C1 and C2 have area constraints. In consideration of these factors, the values of the capacitances C1 and C2 are determined.

The comparator 101 compares the difference signal from the subtractor 73 with the predetermined threshold voltage Vth applied to the inverting input terminal (−). The comparator 101 outputs, for example, an H (High) level or an L (Low) level, which indicates a result obtained by comparing the difference signal and the threshold voltage Vth, to the transfer unit 75 as a quantized value of the difference signal.

The transfer unit 75 outputs the event data indicating the event's occurrence to the output unit 34 in the case where the variation in luminance as an event is recognized to occur through the quantized value of the difference signal from the quantizer 74, i.e., the case where the difference signal (Vout) is larger than the threshold voltage Vth.

The output unit 34 outputs the event data obtained from the transfer unit 75, with position information, time information, and, if necessary, the polarity of the variation in luminance as an event including therein, to the event data. The position information indicates a position of the pixel 51 (the pixel block 41 having this pixel) in which the event indicated by the event data occurs, and the time information indicates the time when the event occurs.

The event data including the position information of the pixel 51 in which the event occurs, the time information indicating the time when the event occurs, and the polarity of the variation in luminance as the event can employ, in one example, a data format called address event representation (AER).

Moreover, the gain A of the entire event detector 52 is expressed by the following formula, where the gain of the current-to-voltage converter 71 is $CG_{log}$, and the gain of the buffer 72 is "1".

$$A = CG_{log} C1/C2 (\Sigma i_{photo\_n}) \quad (6)$$

Where, $i_{photo\_n}$ represents the photocurrent of the n-th pixel 51 among the pixels 51 of I rows and J columns forming the pixel block 41. ">" in Formula (6) represents a summation of integers from 1 to I×J for n.

Moreover, the pixel 51 is capable of receiving any light as the incident light by providing a filter such as a color filter that transmits a predetermined light, for example. In one example, in the case where the pixel 51 receives visible light as the incident light, the event data represents the occurrence of a variation in pixel values in an image in which a visually recognizable subject projects. In addition, in one example, in the case where the pixel 51 receives infrared rays, millimeter waves, or the like for distance measurement as the incident light, the event data represents the occurrence of a variation in the distance to the subject. Furthermore, in one example, in the case where the pixel 51 receives infrared rays for measuring the temperature as the incident light, the event data represents the occurrence of a variation in the temperature of the subject. It is assumed that the pixel 51 receives visible light in the present embodiment as the incident light.

<Exemplary Configuration of Data Processing Unit 22>

Figure 9:
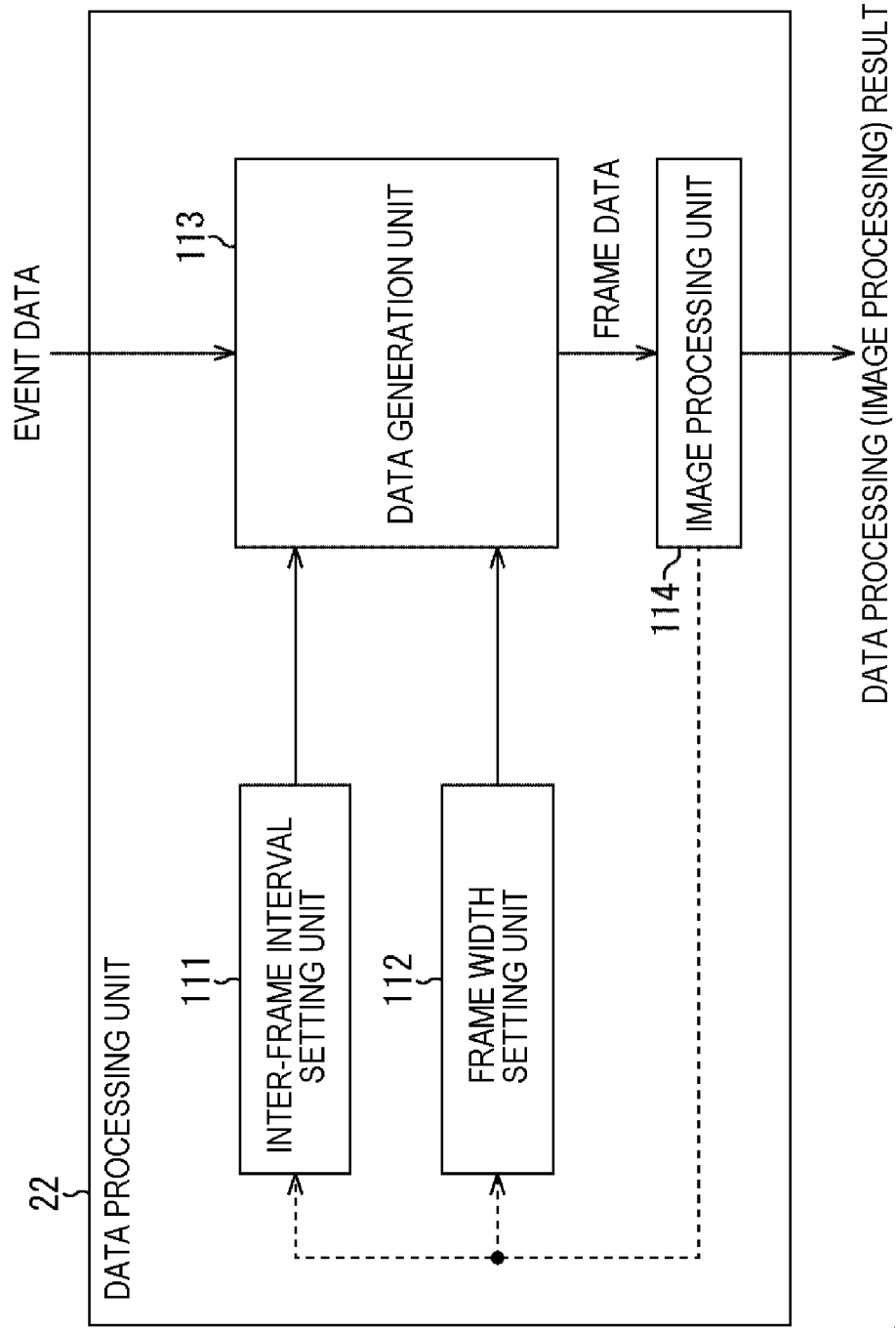
FIG. 9 is a block diagram illustrating an exemplary configuration of a data processing unit 22.

FIG. 9 is a block diagram illustrating an exemplary configuration of a data processing unit 22 in FIG. 1.

In FIG. 9, the data processing unit 22 has an inter-frame interval setting unit 111, a frame width setting unit 112, a data generation unit 113, and an image processing unit 114.

The inter-frame interval setting unit 111 sets an inter-frame interval in accordance with, in one example, a user operation or the like and supplies it to the data generation unit 113. The inter-frame interval represents an interval between frames of the frame data generated depending on the event data, and it is possible to set the inter-frame interval by specifying it on the basis of time or the number of event data. In this description, the inter-frame interval that is set by the inter-frame interval setting unit 111 is also referred to as a set inter-frame interval.

The frame width setting unit 112 sets a frame width in accordance with, in one example, a user operation or the like and supplies it to the data generation unit 113. The frame width represents a width of the time of the event data used to generate the frame data for one frame, and it is possible to set the frame width by specifying it on the basis of time or the number of event data, which is similar to the inter-frame interval. In this description, the frame width that is set by the frame width setting unit 112 is also referred to as a set frame width.

The data generation unit 113 converts the event data into frame data by generating frame data that is image data in a frame format depending on the event data output from the event generation unit 21 to the data processing unit 22. The data generation unit 113 supplies the frame data to the image processing unit 114.

The data generation unit 113 generates the frame data depending on the set inter-frame interval supplied from the inter-frame interval setting unit 111 and the set frame width supplied from the frame width setting unit 112.

In other words, the data generation unit 113 generates the frame data for each of the set inter-frame intervals depending on the event data within the set frame width from the head of the set inter-frame interval.

The image processing unit 114 performs image processing using the frame data supplied from the data generation unit 113, for example, recognition processing on the frame data or the like. The image processing unit 114 outputs a result obtained by performing the image processing (an image processing result) as a data processing result.

The image processing unit 114 can employ any device capable of handling the frame data. In one example, the image processing unit 114 can employ a device configured to perform image recognition using a neural network, an image display device including a display and software as a viewer, or the like.

Moreover, it is possible to employ a predetermined value as the frame width. In this case, the data processing unit 22 can be configured without including the frame width setting unit 112.

Further, the image processing unit 114, in a case where the recognition processing on the frame data is performed and the reliability of the recognition result of the recognition processing can be obtained, as illustrated in FIG. 9, can supply (feedback) the reliability of the recognition result of the recognition processing from the image processing unit 114 to the inter-frame interval setting unit 111 and the frame width setting unit 112. In this case, the inter-frame interval setting unit 111 and the frame width setting unit 112 can set the inter-frame interval and the frame width depending on the reliability of the recognition result.

In other words, the inter-frame interval setting unit 111 and the frame width setting unit 112 can initially set two types of default values of inter-frame interval and frame width. Then, the image processing unit 114 obtains two types of reliability of recognition results by performing recognition processing on the frame data generated depending on two types of default values of inter-frame interval and frame width. From the variation in such reliability, it is possible for the inter-frame interval setting unit 111 and the frame width setting unit 112 to set new inter-frame interval and frame width respectively to improve the recognition result's reliability using a search algorithm such as the gradient method.

From the variation in the reliability of the recognition result obtained for the new inter-frame interval and the frame width, the inter-frame interval setting unit 111 and the frame width setting unit 112 are capable of repeatedly setting further new inter-frame interval and frame width, respectively, to improve the recognition result's reliability until the recognition result's reliability is maximized (maximum).

The inter-frame interval setting unit 111 and the frame width setting unit 112 are capable of setting the inter-frame interval and the frame width, respectively, depending on the result obtained by the image processing (image processing result) performed by the image processing unit 114 as described above.

Further, it can be said that in FIG. 9, the data generation unit 113 functions as a frame data generation unit configured to generate first frame data and second frame data, the first frame data being based on event data indicating a variation in an electrical signal of a pixel generating the electrical signal by performing photoelectric conversion, the event data occurring during a first accumulation time from a first frame generation start time to a first frame generation end time, and the second frame data being based on event data occurring during a second accumulation time from a second frame generation start time to a second frame generation end time. The first accumulation time and the second accumulation time are frame widths.

It can be said that the inter-frame interval setting unit 111 functions as a frame period setting unit that sets a first frame period from a first frame generation start time to a second frame generation start time and supplies it to the frame data generation unit. The first frame period is an inter-frame interval.

The data generation unit 113 that functions as the frame data generation unit is capable of further generating a third frame data based on the event data generated in a third accumulation time from a third frame generation start time to a third frame generation end time. The inter-frame interval setting unit 111 that functions as the frame period setting unit is capable of setting the first frame period and a second frame period to differ. The second frame period ranges from the second frame generation start time to the third frame generation start time. The second frame period is an inter-frame interval.

The frame width setting unit 112 functions as an accumulation time setting unit, which sets the first and second accumulation times and supplies them to the data generation unit 113 that functions as the frame data generation unit.

The frame width setting unit 112 that functions as the accumulation time setting unit is capable of setting the first accumulation time and the second accumulation time so that they differ from each other.

It can be said that the data generation unit 113 functions as the frame data generation unit that generates frame data on the basis of event data that is a variation in the electrical signal of a pixel that performs photoelectric conversion to generate an electrical signal. The event data occurs during the accumulation time from the frame generation start time to the frame generation end time. The accumulation time is the frame width.

The inter-frame interval setting unit 111 functions as a frame period setting unit configured to set and supply a frame period indicating an interval between a frame data generation start time of first frame data and a frame data generation start time of second frame data to the frame data generation unit, the second frame data being generated consecutively with the first frame data. The frame period is an inter-frame interval.

The inter-frame interval setting unit 111 as the frame period setting unit is capable of setting the frame period on the basis of time.

In the case of setting the frame period on the basis of time, the frame width setting unit 112 as the accumulation time setting unit is capable of setting the accumulation time on the basis of time or depending on the number of event data. Furthermore, it is possible to switch between setting the accumulation time on the basis of time and setting it depending on the number of event data.

The inter-frame interval setting unit 111 as the frame period setting unit is capable of setting the frame period depending on the number of event data.

In the case of setting the frame period depending on the number of event data, the frame width setting unit 112 as the accumulation time setting unit is capable of setting the accumulation time on the basis of time or depending on the number of event data. Furthermore, it is possible to switch between setting the accumulation time on the basis of time and setting it depending on the number of event data.

It can be said that the data generation unit 113 functions as the frame data generation unit that generates the first frame data and the second frame data so that the first accumulation time and the second accumulation time may overlap. The first frame data is based on the event data that is variation in electrical signals of a pixel that performs photoelectric conversion to generate the electrical signal, which is generated during the first accumulation time from the first frame generation start time to the first frame generation end time. The second frame data is based on the event data generated during the second accumulation time from the second frame generation start time to the second frame generation end time. The overlapping of the first accumulation time and the second accumulation time means that an overlap region described later is generated.

In the case of setting the frame period depending on the number of event data, the number of frame data generated per unit time (the number of frame data generated by the data generation unit 113) varies depending on the number of event data per unit time (e.g., such as one second). The larger the number of the event data per unit time, the larger the number of the frame data generated per unit time.

It can be said that the data generation unit 113 functions as a frame data generation unit configured to generate frame data on the basis of the event data occurring during an accumulation time from a frame generation start time to a frame generation end time. It can be said that the inter-frame interval setting unit 111 functions as a frame period setting unit configured to set and supply a frame period indicating an interval between a frame data generation start time of first frame data and a frame data generation start time of second frame data to the frame data generation unit, the second frame data being generated consecutively with the first frame data.

As will be described later, the frame width setting unit 112 as the accumulation time setting unit is capable of setting the accumulation time in units of segmented regions in which the frame of the frame data is divided into a plurality of regions. In one example, the accumulation time setting unit is capable of setting the accumulation time depending on an estimated value indicating the adequateness of the accumulation time. More specifically, the accumulation time setting unit is capable of setting the accumulation time depending on the estimated value obtained by using the frame data generated depending on the event data within the accumulation time.

<Generation of Frame Data Depending on Event Data>

Figure 10:
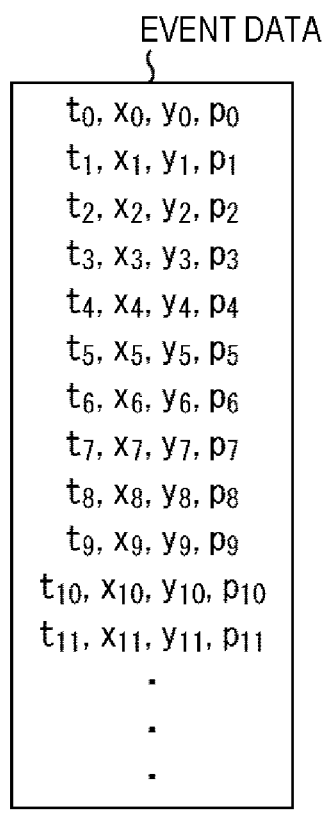
FIG. 10 is a diagram illustrated to describe an overview of event data output by the event generation unit 21.

FIG. 10 is a diagram illustrated to describe an overview of event data output by the event generation unit 21 in FIG. 1.

The event generation unit 21 (the output unit 34 thereof) outputs the event data that includes, in one example, time information $t_i$, coordinates $(x_i, y_i)$, and a polarity $p_i$ of the variation in luminance as an event, as described with reference to FIG. 9. The time information $t_i$ indicates a time point when the event occurred (hereinafter, also referred to as event time). The coordinates $(x_i, y_i)$ are used as position information of the pixel 51 where the event occurred.

The event data is output every time an event occurs, unlike the image data in a frame format (frame data) that is output in a frame cycle in synchronization with the vertical synchronization signal. Thus, the event data fails to be used for image processing without any modification by displaying an image associated with the frame data on a display device such as a projector or inputting it into a discriminator (classifier). The event data is necessary to be converted to the frame data.

In this description, in the event data listed in FIG. 10, the interval between time $t_i$ of a certain event and time $t_{i+1}$ of an event adjacent to the certain event is not necessarily constant. In other words, the event time $t_i$ and the event time $t_{i+1}$ can be the same time or different time points. However, it is assumed that the event time $t_i$ and the event time $t_{i+1}$ have a relationship expressed by the formula $t_i \leq t_{i+1}$.

Figure 11:
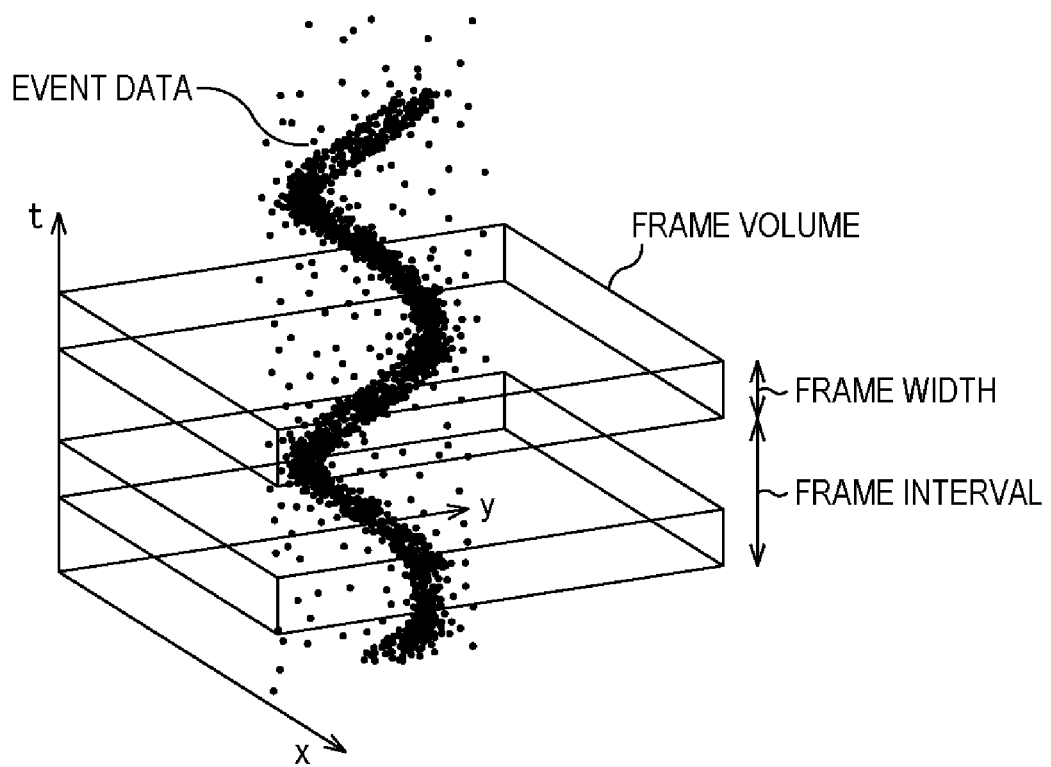
FIG. 11 is a diagram illustrated to describe an overview of a way of generating frame data depending on event data.

FIG. 11 is a diagram illustrated to describe an overview of a way of generating frame data depending on event data.

In FIG. 11, in a three-dimensional space having its x-axis, y-axis, and time axis t, the points indicating the event data are plotted at time t and positions (coordinates thereof) (x, y) of events included in the event data.

In other words, assuming that the position (x, y, t) in the three-dimensional space, which is represented by the time t and position (x, y) of events included in the event data, is a spatiotemporal position of the event, the event data is plotted as points at the spatiotemporal position (x, y, t) of the event in FIG. 11.

The data generation unit 113 starts generating the frame data depending on the event data by using, in one example, a predetermined time point as the generation start time to start the generation of the frame data. Examples of the predetermined time point include a time point when the generation of frame data is instructed by a user operation or the like or time when the power of the data processing chip is turned on.

It is now assumed that the rectangular parallelepiped of the set frame width in the direction of the time axis t for each set inter-frame interval from the generation start time is called a frame volume. The dimension of the frame volume in the x-axis direction and the y-axis direction is equal to, in one example, the number of pixel blocks 41 or the pixels 51 in the x-axis direction and the y-axis direction.

The data generation unit 113 generates the frame data for one frame for each set inter-frame interval depending on the event data in the frame volume of the set frame width from the head of the set inter-frame interval.

The generation of the frame data is performed, in one example, by setting pixels (pixel values thereof) of the frame at the event position (x, y) included in the event data to white and setting pixels at other positions of the frame to a predetermined color such as gray.

Besides, it is possible to generate the frame data considering a polarity included in the event data. In one example, if the polarity is positive, the pixel can be set to white, and if the polarity is negative, the pixel can be set to black. Furthermore, as described with reference to FIG. 5, in the case where the event detector 52 outputs the event data and the pixel signal of the pixel 51, it is possible to generate the frame data using the pixel signal of the pixel 51 depending on the event data. In other words, it is possible to generate the frame data by setting the pixels of the frame at the event position (x, y) included in the event data to the pixel signal of the pixel 51 at that position (x, y) and setting the pixels at other positions of the frame to a predetermined color such as gray.

Moreover, there may be a plurality of event data having different event time t but the same event position (x, y) in the frame volume. In this case, in one example, it is possible to give priority to the event data having the latest or oldest event time t. Moreover, in the case where the event data has a polarity, it is possible to add the polarities of a plurality of event data having different event time t but the same event position (x, y) and set a pixel value corresponding to an added value obtained by the addition to a pixel at the event position (x, y).

In this description, in the case where the frame width and the inter-frame interval are the same, the frame volumes are in contact with each other without any gaps. In addition, in the case where the inter-frame interval is larger than the frame width, the frame volumes are arranged with a gap. In the case where the frame width is larger than the inter-frame interval, the frame volumes are arranged in a partially overlapping state.

Figure 12:
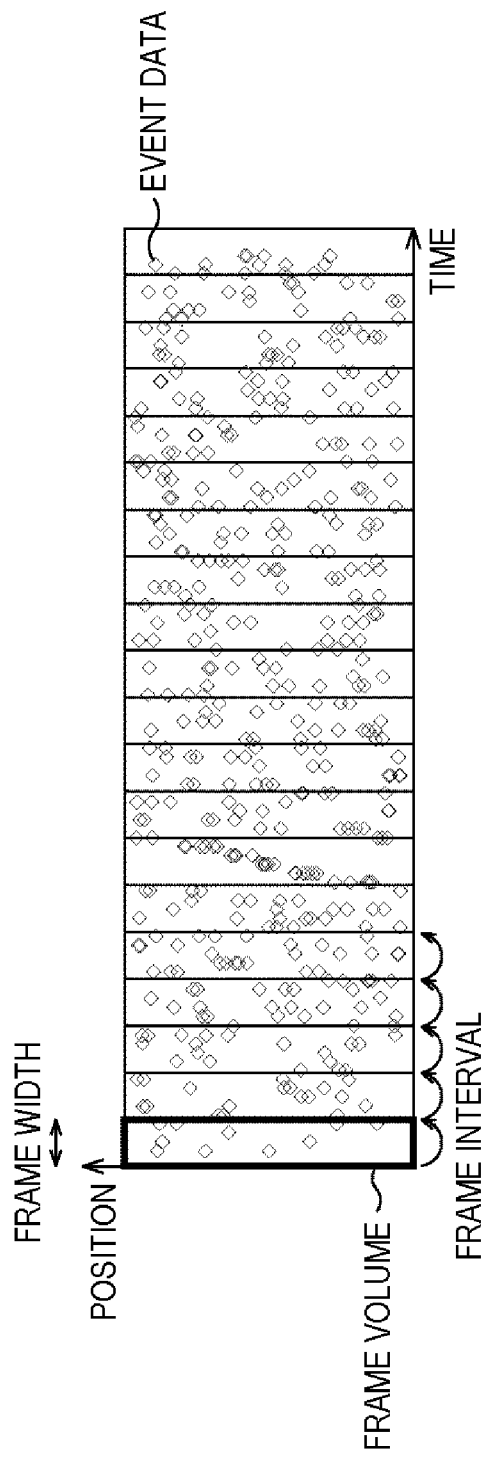
FIG. 12 is a diagram illustrating a first setting way of frame width and inter-frame interval.

FIG. 12 is a diagram illustrating a first setting way of frame width and inter-frame interval.

In FIG. 12, the event data is plotted with the horizontal axis as the event time t and the vertical axis as the event position (x, y).

In the first setting way, the frame width and the inter-frame interval are set to have the same time as each other and a relatively short time period by specifying them on the basis of time.

In the first setting way, the inter-frame interval is short, so it is possible to obtain the frame data with a large frame rate. If the frame rate of the frame data is larger than the frame rate of playback (e.g., such as 30 frames per second (fps)), the playback of the image associated with the frame data is the slow playback.

In the first setting way, the frame width is the same as the short-time inter-frame interval, so the frame volume is relatively thin, and the number of event data included in the frame volume tends to be small. Then, an image associated with the frame data generated by such a small number of event data tends to be an image in which the subject does not appear clearly (difficult to see), and further, image recognition performed for such an image is difficult to obtain satisfactory recognition performance.

Figure 13:
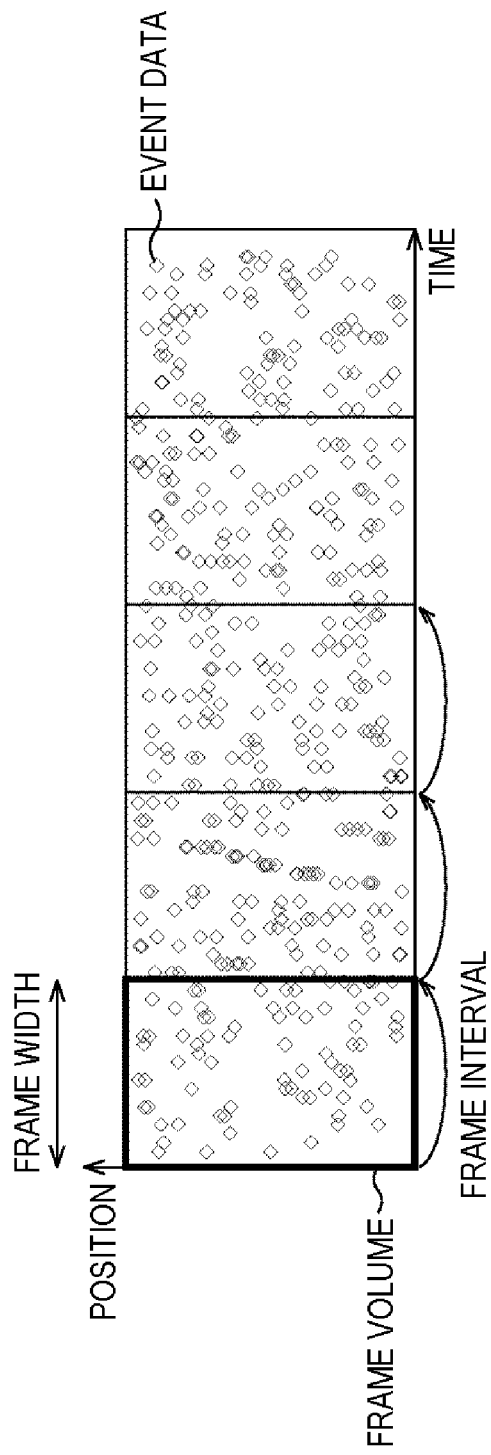
FIG. 13 is a diagram illustrating a second setting way of frame width and inter-frame interval.

FIG. 13 is a diagram illustrating a second setting way of frame width and inter-frame interval.

In FIG. 13, similarly to FIG. 12, the event data is plotted with the horizontal axis as the event time t and the vertical axis as the event position (x, y).

In the second setting way, the frame width and the inter-frame interval are set to have the same time by specifying them on the basis of time. However, in the second setting way, the frame width and the inter-frame interval are set to have longer in time than the first setting way.

In the second setting way, the inter-frame interval is longer than that of the first setting way, so the frame rate of the frame data generated from the event data is lower than that of the first setting way. If the frame rate of the frame data is lower than the frame rate being played back, the playback of the image associated with the frame data is the fast-forward playback.

In the second setting way, the frame width is the same as the inter-frame interval of a long time, so the frame volume is relatively thick, and it tends to increase the number of event data included in the frame volume with ease to some extent. Then, the image associated with the frame data generated depending on such a large number of event data is an image in which the subject appears clearly.

However, in the second setting way, for a subject with intense movement, the image associated with the frame data tends to be an image in which the motion blur is noticeable, making it difficult to visually recognize the subject's minute movement. Furthermore, in the second setting way, the inter-frame interval is long and the frame rate of the frame data is low. Thus, the movement of the subject projecting in the image associated with the frame data is liable to be so to speak lagging. In addition, the image recognition on the image associated with the frame data is liable to obtain unsatisfactory recognition performance of a moving object (a moving subject).

Figure 14:
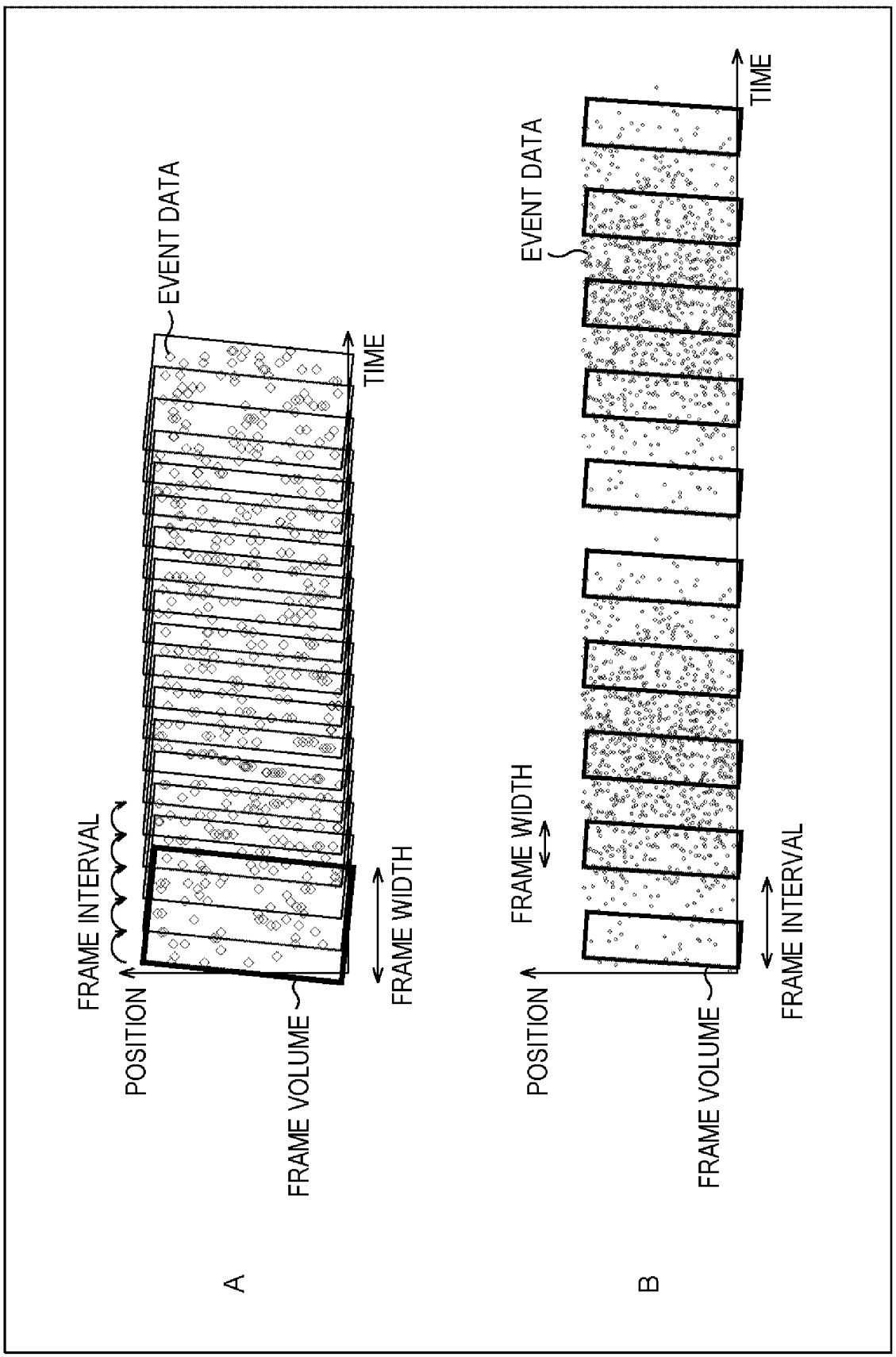
FIG. 14 is a diagram illustrating a third setting way of frame width and inter-frame interval.

FIG. 14 is a diagram illustrating a third setting way of frame width and inter-frame interval.

In FIG. 14, similarly to FIG. 12, the event data is plotted with the horizontal axis as the event time t and the vertical axis as the event position (x, y).

In this description, FIG. 14 illustrates rectangles indicating the frame volume tilted to some extent to avoid overlapping the rectangles as the frame volume and making them difficult to recognize visually. In FIG. 14, the reason why the rectangle indicating the frame volume is tilted is intended to avoid making the figure hard to observe. Still, the frame volume is not actually tilted. Furthermore, in FIG. 14, the rectangles as the frame volume include a thick line rectangle and a thin line rectangle, but this is also intended to avoid making the figure hard to observe. There is no difference between the frame volumes represented by the thick line rectangle and the thin line rectangle.

In the third setting way, the frame width and the inter-frame interval are set to have respective individual time by specifying them on the basis of time.

In FIG. 14, portion A illustrates an example of setting the inter-frame interval and the frame width in the case of setting the frame width to be longer in time than the inter-frame interval. In FIG. 14, portion B illustrates an example of setting the inter-frame interval and the frame width in the case of setting the frame width to be shorter in time than the inter-frame interval.

In portion A of FIG. 14, the inter-frame interval is set to a short time as in the first setting way, and the frame width is set to a long time as in the second setting way.

In portion A of FIG. 14, the frame width is set to a long time as in the second setting way, so it can increase the number of event data included in the frame volume with ease to some extent. Then, the image associated with the frame data generated depending on such a large number of event data allows the subject to appear clearly and to have high visibility.

Furthermore, in portion A of FIG. 14, the inter-frame interval is a short time similarly to the first setting way, so it is possible to increase the frame rate of the frame data to some extent. Thus, as an image associated with the frame data, it is possible to obtain an image in which the movement of a fast-moving subject (a moving object) appears smoothly.

As described above, in the third setting way, it is possible to obtain appropriate frame data by setting the frame width and the inter-frame interval independently at different time intervals. In other words, in one example, it is possible to obtain frame data that produces an image with high visibility and smooth movement. Thus, the image recognition performed on an image associated with such frame data makes it possible to obtain satisfactory recognition performance.

Moreover, in portion A of FIG. 14, the frame width is set to longer in time than the inter-frame interval, so the frame volumes of one frame (a frame used for generating frame data) and the next frame have a partially overlapping region.

In this case, in the data generation unit 113 (FIG. 9), frame data is generated for each of the two adjacent frames depending on the event data in the overlapping region of the frame volume of the two frames. Thus, it can be said that frame data sharing the same event data in the overlapping region is generated for two adjacent frames.

In addition, this can also be considered that frame data is generated by reusing, for the next f+1-th frame of a certain f-th frame, the event data in the overlapping region used to generate the frame data of the f-th frame preceding the f+1-th frame.

In portion B of FIG. 14, the inter-frame interval is set to be longer in time than the frame width (i.e., the frame width is set to be shorter in time than the inter-frame interval).

The use of the inter-frame interval that is set to be longer than the frame width is efficient, in one example, in the case where the occurrence frequency of events is low. In other words, setting the inter-frame interval to be longer than the frame width makes it possible to prevent or reduce the generation of frame data in which frames projecting similar scenes continue for a long time.

<Exemplary Configuration of Data Generation Unit 113>

Figure 15:
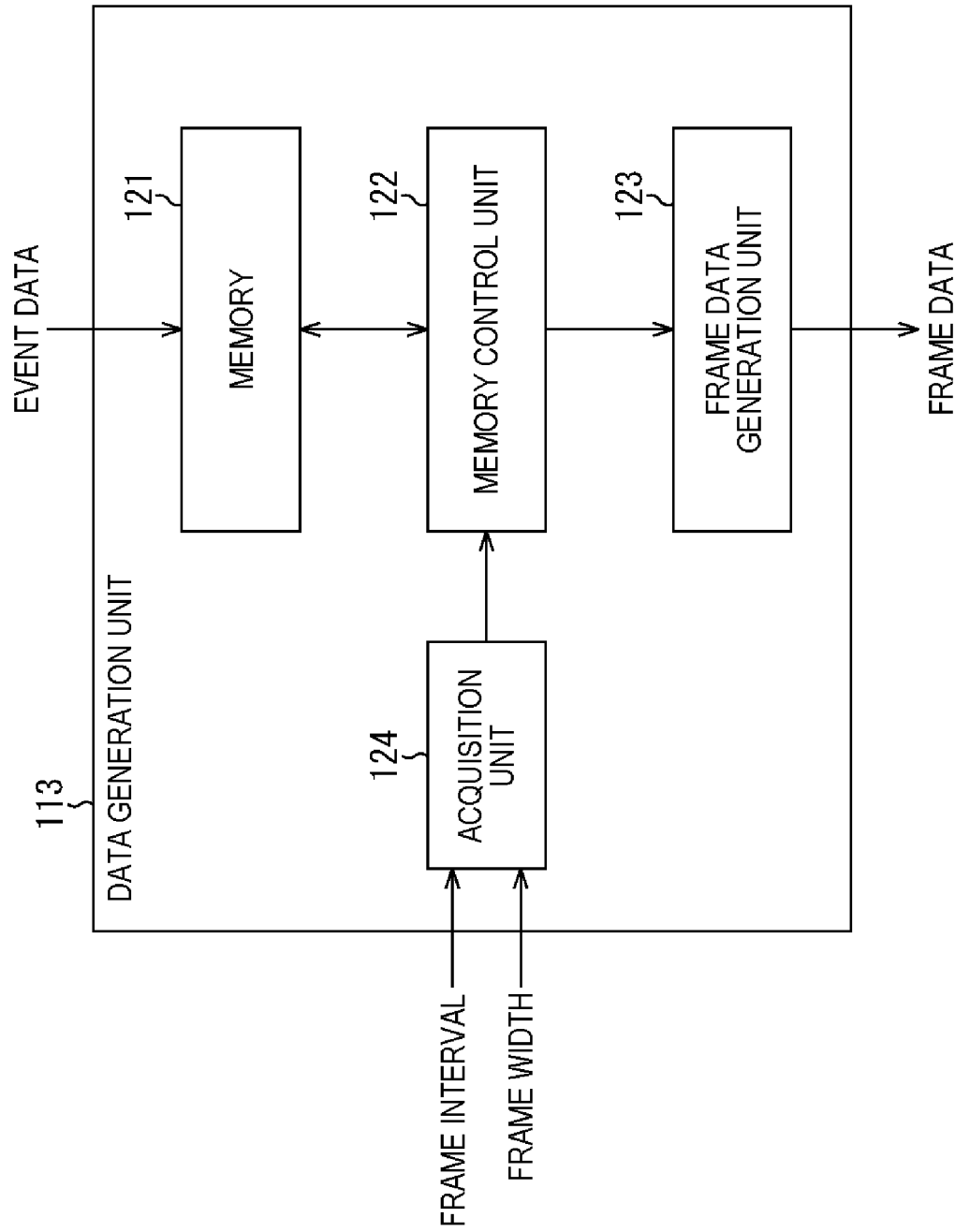
FIG. 15 is a block diagram illustrating an exemplary configuration of a data generation unit 113.

FIG. 15 is a block diagram illustrating an exemplary configuration of a data generation unit 113 in FIG. 9.

In FIG. 15, the data generation unit 113 has a memory 121, a memory control unit 122, a frame data generation unit 123, and an acquisition unit 124.

The memory 121 is supplied with the event data from the event generation unit 21. The memory 121 stores the event data from the event generation unit 21. Moreover, the memory 121 sequentially stores the event data in the storage area. If the storage area is full of event data, the memory 121 stores the latest event data in the form of overwriting the oldest event data with the latest event data.

The memory control unit 122 controls reading or the like of the event data from the memory 121. The memory control unit 122 reads the event data in the frame volume from the memory 121 by controlling, in one example, the memory 121 depending on the set inter-frame interval and the set frame width supplied from the acquisition unit 124, and supplies it to the frame data generation unit 123.

The frame data generation unit 123 generates frame data for one frame depending on the event data in the frame volume supplied from the memory control unit 122 and supplies it to the image processing unit 114 (FIG. 9).

The acquisition unit 124 acquires the set inter-frame interval from the inter-frame interval setting unit 111 and acquires the set frame width from the frame width setting unit 112. Then, the acquisition unit 124 supplies the set inter-frame interval and the set frame width to the memory control unit 122.

Figure 16:
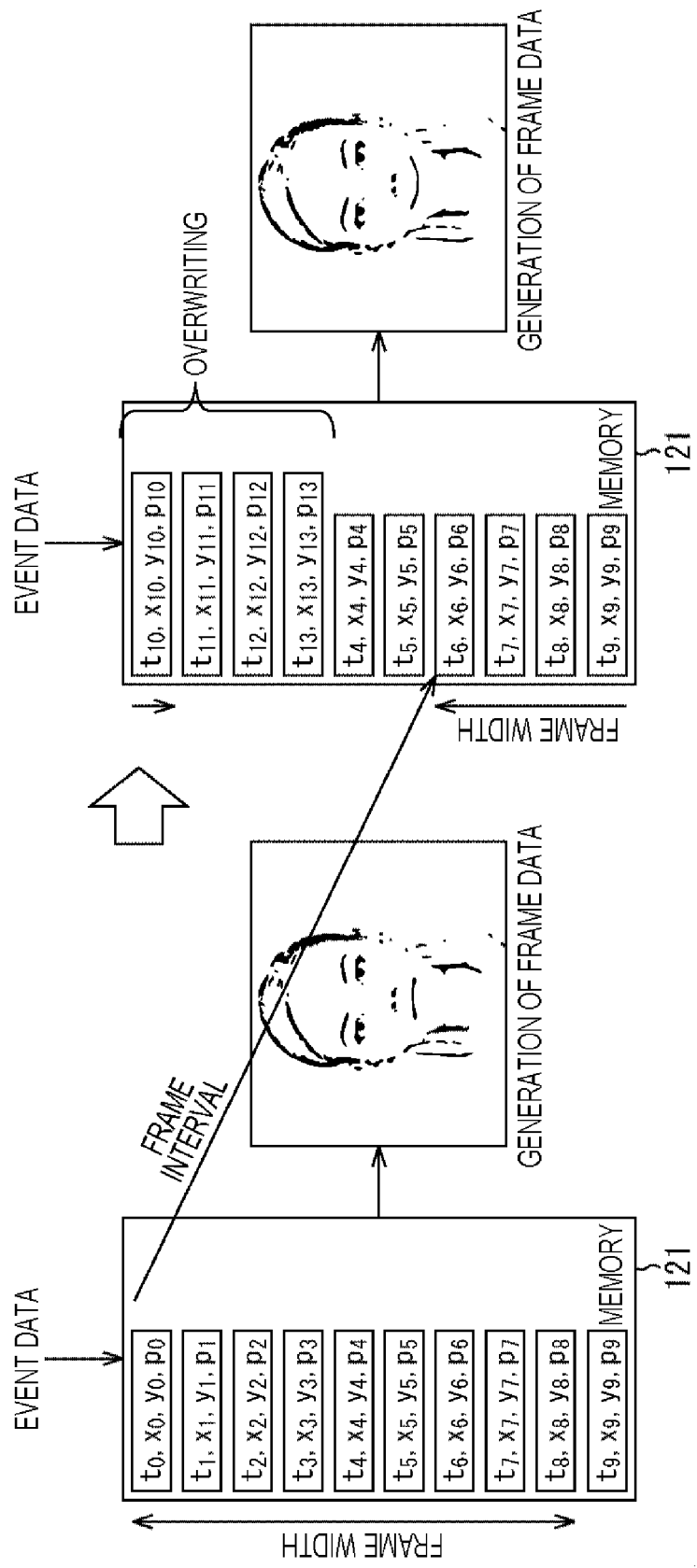
FIG. 16 is a diagram illustrated to describe an example of control of a memory 121 by a memory control unit 122.

FIG. 16 is a diagram illustrated to describe an example of control of a memory 121 by a memory control unit 122.

The memory 121 sequentially (in time series) stores the event data supplied from the event generation unit 21.

In one example, the memory control unit 122 reads the event data that includes the event time t within the time as the set frame width from the event time $t_0$ of the event data initially stored in the memory 121. In this case, the event data is read as event data in the frame volume of the first frame from the memory 121.

In FIG. 16, the event data from event time $t_0$ to event time $t_8$ is read from the memory 121 as event data in the frame volume of the first frame. The frame data is generated depending on the read event data.

The memory control unit 122 reads, from the memory 121, the event data from event time $t_0$ to event time $t_8$ as the event data in the frame volume of the first frame. Then, the memory control unit 122 releases a storage area of the event data that includes the time t of the event among storage areas of the memory 121. This release is performed within the time from the time at the head of the frame volume of the first frame (the head of the set inter-frame interval) to immediately before the time after the lapse of the set inter-frame interval.

In FIG. 16, in the memory 121, the storage areas from the event data at event time $t_0$ to the event data at event time $t_5$ are released. It is possible to store new event data in the released storage area in the memory 121. In FIG. 16, the event data from event time $t_{10}$ to event time $t_{13}$ is stored by overwriting in the storage area where the event data from event time $t_0$ to event time $t_3$ was stored.

Then, the memory control unit 122 sets the time after the set inter-frame interval from the start time of the frame volume from which the event data is read immediately before from the memory 121 as the head of the second frame volume. Then, the memory control unit 122 reads, from the memory 121, the event data including the time t of the event within the time as the set frame width from the head, as the event data in the frame volume of the second frame.

In FIG. 16, the event data from event time $t_6$ to event time $t_{10}$ is read from the memory 121 as event data in the frame volume of the second frame. The frame data is generated depending on the read event data.

The third and subsequent event data is then read similarly.

<Processing by Data Processing Unit 22>

Figure 17:
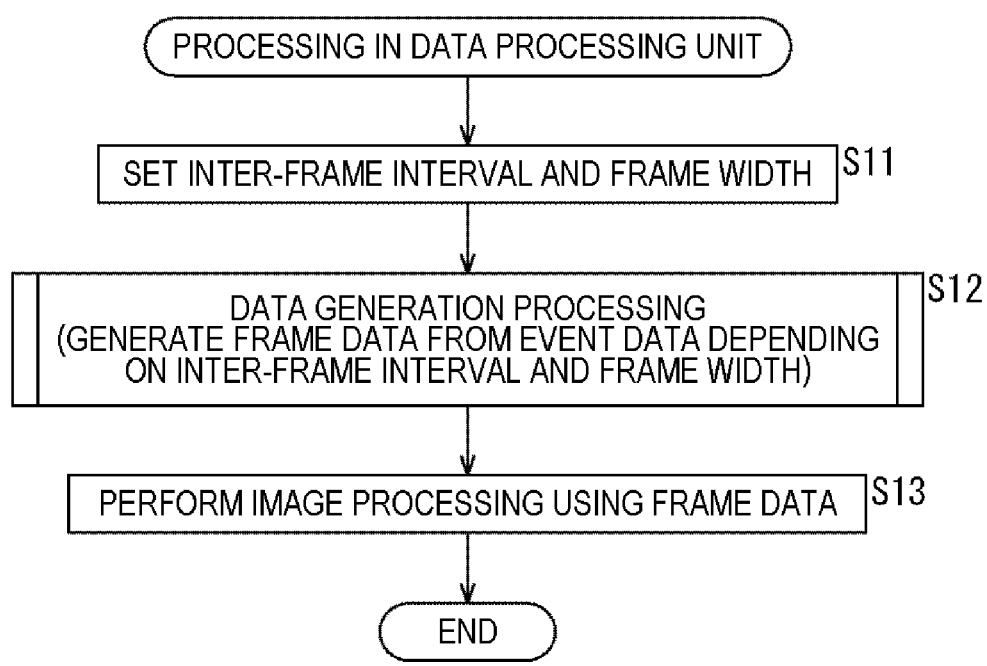
FIG. 17 is a flowchart illustrated to describe an example of processing by a data processing unit 22.

FIG. 17 is a flowchart illustrated to describe an example of processing by a data processing unit 22 FIG. 9.

In step S11, the inter-frame interval setting unit 111 sets and supplies the inter-frame interval to the data generation unit 113. The frame width setting unit 112 sets and supplies the frame width to the data generation unit 113. The processing proceeds to step S12.

In step S12, the data generation unit 113 performs data generation processing of generating frame data depending on the inter-frame interval (the set inter-frame interval) from the inter-frame interval setting unit 111, the frame width (the set frame width) from the frame width setting unit 112, and the event data from the event generation unit 21 (FIG. 1). The processing proceeds to step S13.

In step S13, the image processing unit 114 performs image processing using the frame data obtained in the data generation processing performed in step S12.

Figure 18:
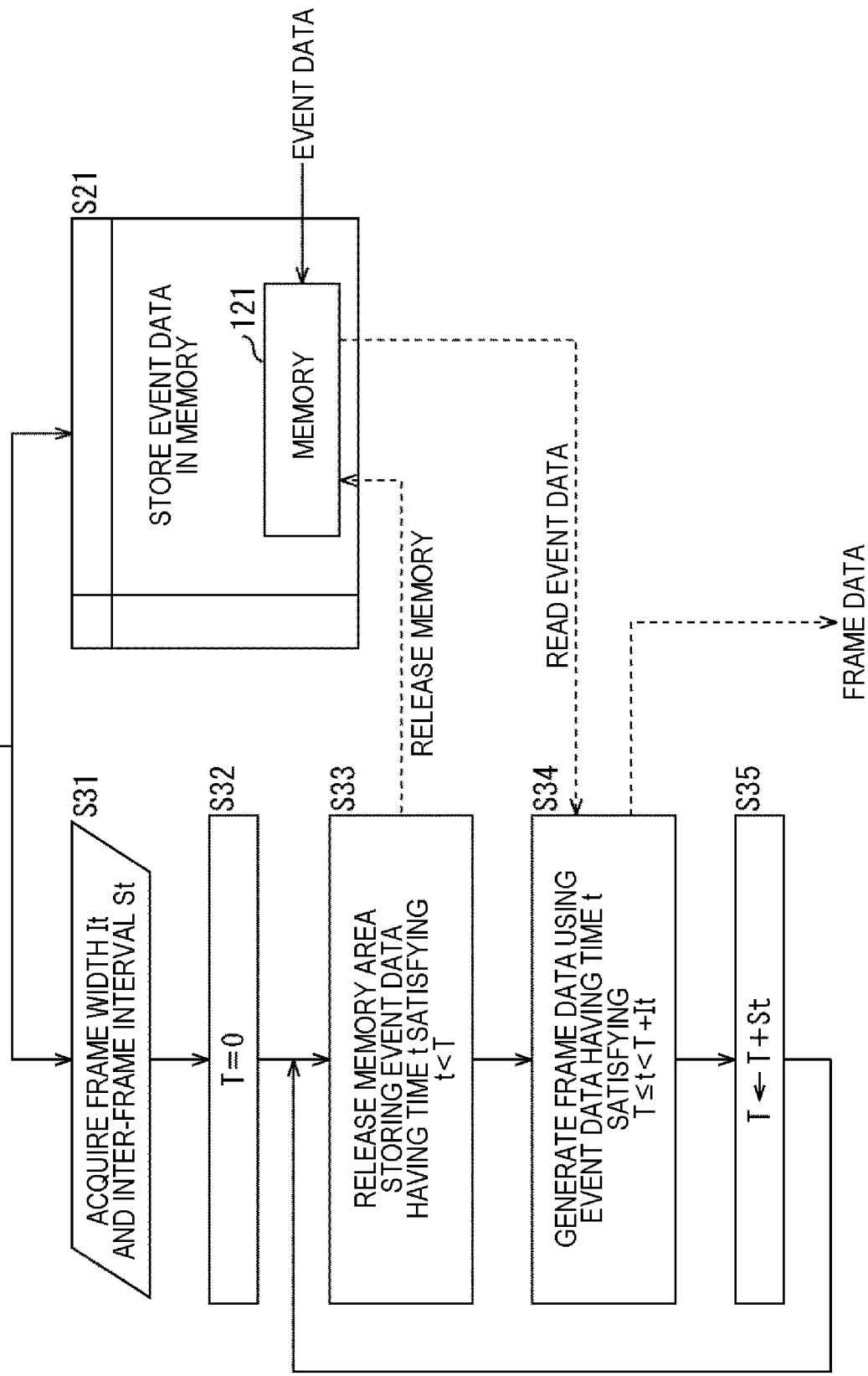
FIG. 18 is a flowchart illustrated to describe an example of data generation processing performed by a data generation unit 113.

FIG. 18 is a flowchart illustrated to describe an example of data generation processing performed by a data generation unit 113 in step S12 in FIG. 17.

In the data generation unit 113 (FIG. 15), in step S21, the memory 121 sequentially stores the event data from the event generation unit 21.

On the other hand, in the data generation unit 113, in step S31, the acquisition unit 124 acquires the set inter-frame interval St that is set by the inter-frame interval setting unit 111 and the set frame width It that is set by the frame width setting unit 112, and supplies them to the memory control unit 122. The processing proceeds to step S32.

In step S32, the memory control unit 122 sets the time (a variable representing the time) T at the head of the frame volume (inter-frame interval) to zero. The processing proceeds to step S33.

In step S33, the memory control unit 122 releases a storage area (memory area) of the memory 121 in which the event data where the event time t satisfies the equation t<T is stored. The processing proceeds to step S34. The event data obtained in step S21 can be stored in the released storage area in the memory 121.

In step S34, the memory control unit 122 reads the event data in which the event time t satisfies the equation T<=t<T+It from the memory 121 as the event data in the frame volume of one frame and supplies it to the frame data generation unit 123.

The frame data generation unit 123 generates frame data depending on the event data in the frame volume from the memory control unit 122 and supplies it to the image processing unit 114. The processing proceeds from step S34 to step S35.

In step S35, the memory control unit 122 updates the time T to T+St. Then, the processing returns from step S35 to step S33, and similar processing is repeated.

<Specifying Inter-Frame Interval and Frame Width Using Number of Event Data>

Figure 19:
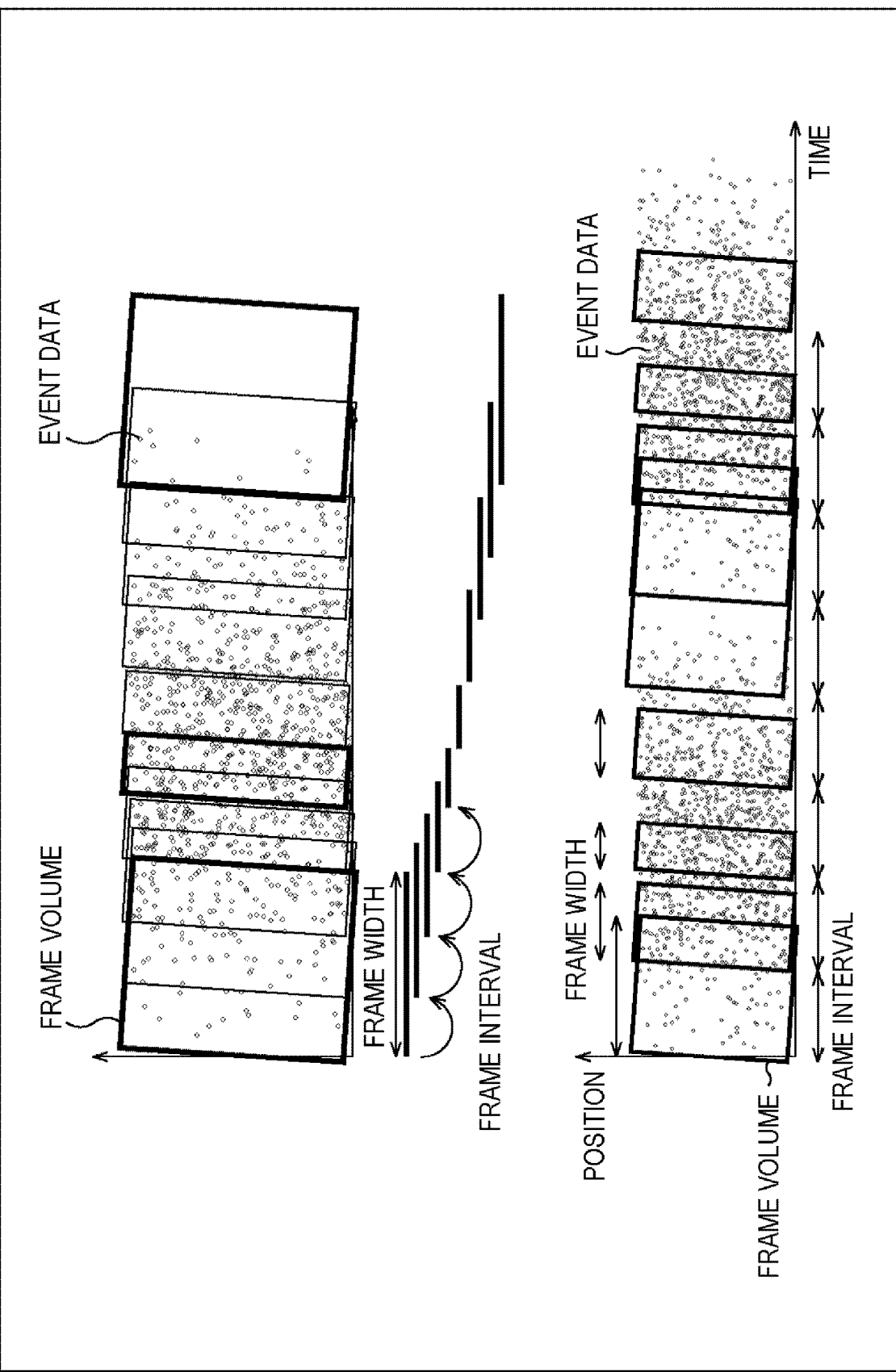
FIG. 19 is a diagram illustrating a fourth setting way of frame width and inter-frame interval.

FIG. 19 is a diagram illustrating a fourth setting way of frame width and inter-frame interval.

In FIG. 19, similarly to FIG. 12, the event data is plotted with the horizontal axis as the event time t and the vertical axis as the event position (x, y).

In the fourth setting way, the inter-frame interval is set by specifying it on the basis of time, and the frame width is set by specifying it on the basis of the number of event data.

In the fourth setting way, the inter-frame interval is specified on the basis of time, so the inter-frame interval is constant time. Thus, the frame rate of the frame data is constant.

However, in the fourth setting way, the frame width is specified on the basis of the number of event data, the frame width is a variable time depending on the occurrence frequency of the event. In other words, in the case where the frame width is specified on the basis of the number of event data, the width in the direction at the time axis t of the frame volume when the number of event data in the frame volume reaches the specified number is treated as the set frame width.

Thus, in the fourth setting way, in the case where the occurrence frequency of event data is low, the time as the frame width is high. On the other hand, in the case where the occurrence frequency of event data is high, the time as the frame width is low.

In the fourth setting way, the generation of frame data waits until the number of event data in the frame volume reaches the specified number, and frame data for one frame is generated depending on the specified number of event data.

Thus, in one example, in a scene in which a moving object moves from one of the left and right sides of the screen to the other, the movement of the moving object causes a large number of events in a short time while the moving object is moving in the screen. The frame data is generated in which the moving object appears in the image.

On the other hand, in the case where no moving object exists on the screen, events rarely occur, so it takes a long time for the number of event data in the frame volume to reach the specified number. In one example, events (most of them) that occur in the case where no moving object exists on the screen are events caused by a slight movement of the background. Thus, in the case where no moving object exists on the screen, the frame data is generated after waiting for a specified number of events due to the movement of the background to occur for a long time.

In this case, a slightly moving background is projected on the image associated with the frame data.

Thus, the fourth setting way makes it possible to achieve the function of automatic exposure (AE) in which the exposure time is adaptively adjusted depending on the occurrence frequency of events. Examples of the function of AE in which the exposure time is adaptively adjusted depending on the occurrence frequency of events include capturing an image in short exposure time during the movement of the moving object on the screen or capturing an image in long exposure time in the case where the moving object is not on the screen.

Moreover, the inter-frame interval can be set by specifying it on the basis of time as in the third and fourth setting ways. In this case, setting the frame width by specifying it on the basis of time as in the third setting way and setting the frame width by specifying it on the basis of the number of event data as in the fourth setting way can be switched adaptively.

In other words, setting the frame width by specifying it on the basis of time as in the third setting way and setting the frame width by specifying it on the basis of the number of event data can be switched, in one example, in response to the user operation.

Further, setting the frame width by specifying it on the basis of time as in the third setting way or setting the frame width by specifying it on the basis of the number of event data can be switched, in one example, depending on the occurrence frequency of events in a predetermined fixed time, i.e., the number of event data.

In this description, in the case where the frame width is set by specifying it on the basis of the number of event data, the frame data is not generated until the number of event data reaches the specified number. Thus, if the occurrence frequency of events continues to be extremely low, a situation may occur in which the frame data is not generated for a long time. Thus, in the case where the occurrence frequency of events within a predetermined fixed time falls below a preset threshold, it is possible to switch the setting of the frame width into the setting based on time. On the other hand, in the case where the occurrence frequency of events within a predetermined fixed time is equal to or higher than the preset threshold, it is possible to switch the setting of the frame width on the basis of time into the setting of it on the basis of the number of event data.

Figure 20:
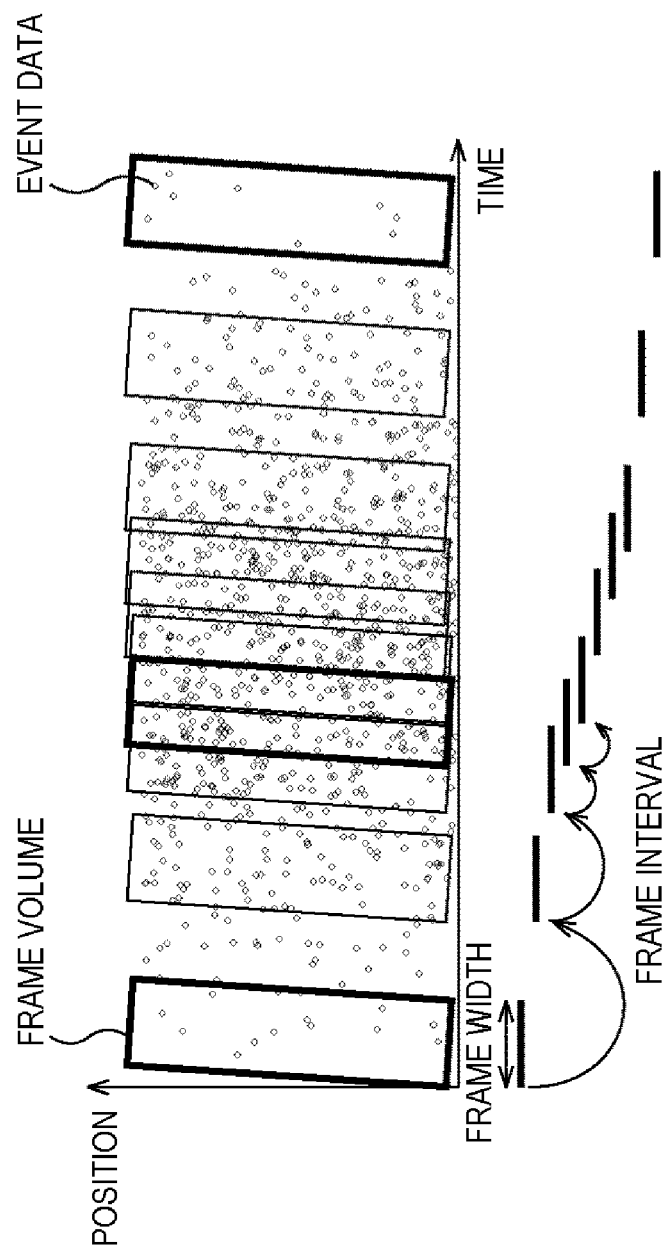
FIG. 20 is a diagram illustrating a fifth setting way of frame width and inter-frame interval.

FIG. 20 is a diagram illustrating a fifth setting way of frame width and inter-frame interval.

In FIG. 20, similarly to FIG. 12, the event data is plotted with the horizontal axis as the event time t and the vertical axis as the event position (x, y).

In the fifth setting way, the inter-frame width is set by specifying it on the basis of time, and the frame interval is set by specifying it on the basis of the number of event data.

In the fifth setting way, the frame width is specified on the basis of time, so the frame width is a fixed time.

However, in the fifth setting way, the inter-frame interval is specified on the basis of the number of event data, so the inter-frame interval is variable time depending on the occurrence frequency of events. In other words, in the case where the inter-frame interval is specified on the basis of the number of event data, the time from the head of the frame volume to the head of the next frame volume when the number of event data from the head of the frame volume to the head of the next frame volume reaches the specified number is treated as the set inter-frame interval.

Thus, in the fifth setting way, in the case where the occurrence frequency of event data is low, the time as the frame interval is high. On the other hand, in the case where the occurrence frequency of event data is high, the time as the frame interval is low.

In the fifth setting way, the timing at which the number of event data from the head of the immediately preceding frame volume reaches the specified number is set as the head of the latest frame volume, and frame data for one frame is generated depending on the event data in the latest frame volume.

Thus, in one example, in a scene in which a moving object moves from one of the left and right sides of the screen to the other, the movement of the moving object causes a large number of events in a short time while the moving object moves in the screen. This makes the frequency with which frame data is generated large. Consequently, the frame rate of the frame data is large.

On the other hand, in the state where no moving object exists on the screen, events rarely occur, so it takes a long time for the number of event data in the frame volume to reach the specified number. Thus, in the state where no moving object exists on the screen, the frequency of generating the frame data is low, and as a result, the frame rate of the frame data is low.

Thus, the fifth setting way makes it possible to achieve the function in which the frame rate of frame data is adjusted adaptively depending on the occurrence frequency of events. Examples of the function in which the frame rate of frame data is adjusted adaptively include increasing the frame rate of the frame data while the moving object is moving on the screen and decreasing the frame rate of the frame data while no moving object exists on the screen.

Such an adaptive adjustment of the frame rate of the frame data allows continuous shooting to be available due to the large frame rate of the frame data even in the case where a moving object exists on the screen.

Moreover, it is assumed that the frame data obtained using the fifth setting way is played back at a constant frame rate. In the scene where the moving object is moving on the screen, the playback of the image associated with the frame data is the slow playback. On the other hand, in the scene where no moving object exists on the screen, the playback of the image associated with the frame data is the fast-forward playback.

Figure 21:
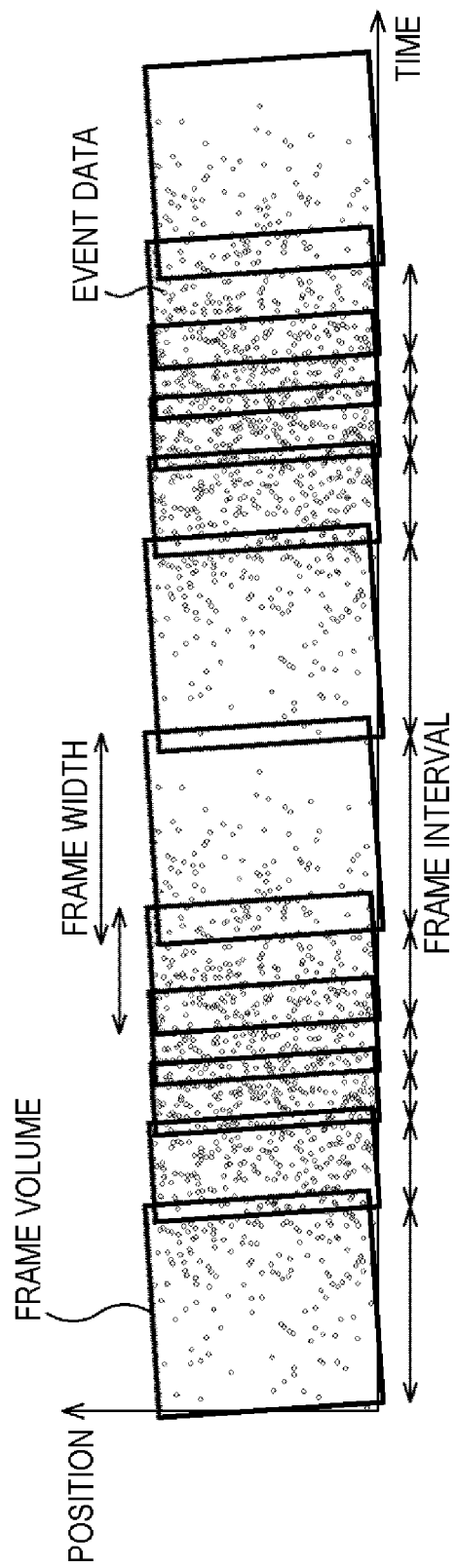
FIG. 21 is a diagram illustrating a sixth setting way of frame width and inter-frame interval.

FIG. 21 is a diagram illustrating a sixth setting way of frame width and inter-frame interval.

In FIG. 21, similarly to FIG. 12, the event data is plotted with the horizontal axis as the event time t and the vertical axis as the event position (x, y).

In the sixth setting way, both the inter-frame interval and the frame width are set by specifying them on the basis of the number of event data.

In the sixth setting way, the inter-frame interval and the frame width are specified on the basis of the number of event data, so the inter-frame interval and the frame width are variable time depending on the occurrence frequency of events in similar ways to the fifth setting way and the fourth setting way, respectively. In other words, the large occurrence frequency of events makes the time as the inter-frame interval and frame width shorter, and the low occurrence frequency of events makes the time as the inter-frame interval and frame width longer.

Thus, similarly to the fifth setting way, the sixth setting way makes it possible to achieve the function in which the frame rate of frame data is adjusted adaptively depending on the occurrence frequency of events. Examples of the function in which the frame rate of frame data is adjusted adaptively include increasing the frame rate of the frame data while the moving object is moving on the screen and decreasing the frame rate of the frame data while no moving object exists on the screen.

Further, similarly to the fourth setting way, the sixth setting way makes it possible to achieve the function of AE in which the exposure time is adaptively adjusted depending on the occurrence frequency of events. Examples of the function of AE in which the exposure time is adaptively adjusted depending on the occurrence frequency of events include capturing an image in short exposure time during the movement of the moving object on the screen or capturing an image in long exposure time in the case where the moving object is not on the screen.

Moreover, the inter-frame interval can be set by specifying it on the basis of the number of event data as in the fifth and sixth setting ways. In this case, setting the frame width by specifying it on the basis of time as in the fifth setting way and setting the frame width by specifying it on the basis of the number of event data as in the sixth setting way can be switched adaptively.

In other words, setting the frame width by specifying it on the basis of time or setting the frame width by specifying it on the basis of the number of event data can be switched depending on, for example, a user operation or the occurrence frequency of events within a predetermined fixed time or the like as described with reference to FIG. 20.

Further, setting the inter-frame interval by specifying it on the basis of time as in the third setting way and the fourth setting way or setting the inter-frame interval by specifying it on the basis of the number of event data as in the fifth setting way and the sixth setting way can be switched adaptively.

In other words, setting the frame interval by specifying it on the basis of time and setting the frame interval by specifying it on the basis of the number of event data can be switched, in one example, in response to the user operation.

Further, setting the inter-frame interval by specifying it on the basis of time or setting the inter-frame interval by specifying it on the basis of the number of event data can be switched depending on, for example, the frame rate of frame data or the power consumption of the data processing unit 22.

In this description, in the case where the inter-frame interval is set by specifying it on the basis of the number of event data, the frame rate of the frame data varies. Thus, the power consumption of the data processing unit 22 (FIG. 1), the storage capacity necessary for storing the frame data, or a load of image processing performed on the frame data by the image processing unit 114 (FIG. 9) varies.

Thus, in the case where the power consumption obtained by measuring the power consumption of the data processing unit 22 exceeds the threshold, the setting of the inter-frame interval can be switched into the setting by specifying it on the basis of time. On the other hand, in the case where the power consumption of the data processing unit 22 is equal to or less than the threshold, it is possible to switch the setting of the inter-frame interval into the setting the inter-frame interval by specifying it on the basis of the number of event data. This makes it possible to prevent or reduce an increase in power consumption of the data processing unit 22.

Besides, the setting of the inter-frame interval by specifying it on the basis of the time or the setting of the inter-frame interval by specifying it on the basis of the number of event data can be switched. This switching depends on the storage capacity necessary for storing the frame data, the load of image processing performed on the frame data by the image processing unit 114, or the like.

<Description of Computer to which Present Technology is Applied>

Next, the series of processing of the data processing unit 22 can be performed by hardware or software. In the case where the series of processing is performed by software, a program that constitutes the software is installed in a computer such as a microcomputer, or the like.

Figure 22:
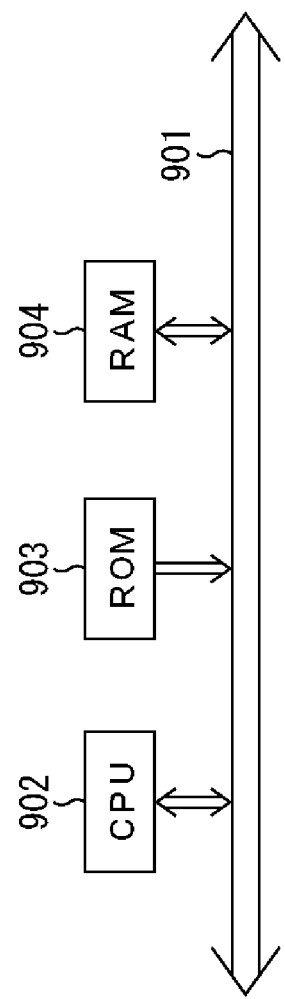
FIG. 22 is a block diagram illustrating an exemplary configuration of an embodiment of a computer to which the present technology is applied.

FIG. 22 is a block diagram illustrating a configuration example of an embodiment of a computer in which a program for executing the above-mentioned series of processing is installed.

It is possible to record the program in advance on a ROM 903 serving as a recording medium incorporated in the computer.

Alternatively, the program can be stored (recorded) on a removable recording medium. It is possible to provide such removable recording medium as so-called packaged software. In this regard, an example of the removable recording medium includes a flexible disk, a compact disc read-only memory (CD-ROM), a magneto-optical (MO) disk, a digital versatile disc (DVD), a magnetic disk, a semiconductor memory, or the like.

Moreover, it is possible to install the program in the computer from the removable recording medium as described above or can be downloaded to the computer via a communication network or a broadcasting network to be installed.

The computer has a built-in central processing unit (CPU) 902, and a ROM 903 and a RAM 904 are connected to the CPU 902 via a bus 901.

The CPU 902 executes the program stored in a read only memory (ROM) 903.

This allows the CPU 902 to execute the processing in accordance with the above-mentioned flowchart or the processing performed by using the configuration of the above-mentioned block diagram.

In this regard, in this specification, the computer does not necessarily need to perform the processing in accordance with the program in order shown in the flowchart in a time series. That is, the processing performed by the computer in accordance with the program also includes processing executed in parallel or individually (e.g., parallel processing or object-oriented processing).

Further, it is possible to process the program may be processed by a single computer (processor) or to dispersedly process it by a plurality of computers. Furthermore, it is possible to transfer the program to a remote computer for execution.

<Examples of Practical Use for Mobile Objects>

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 23:
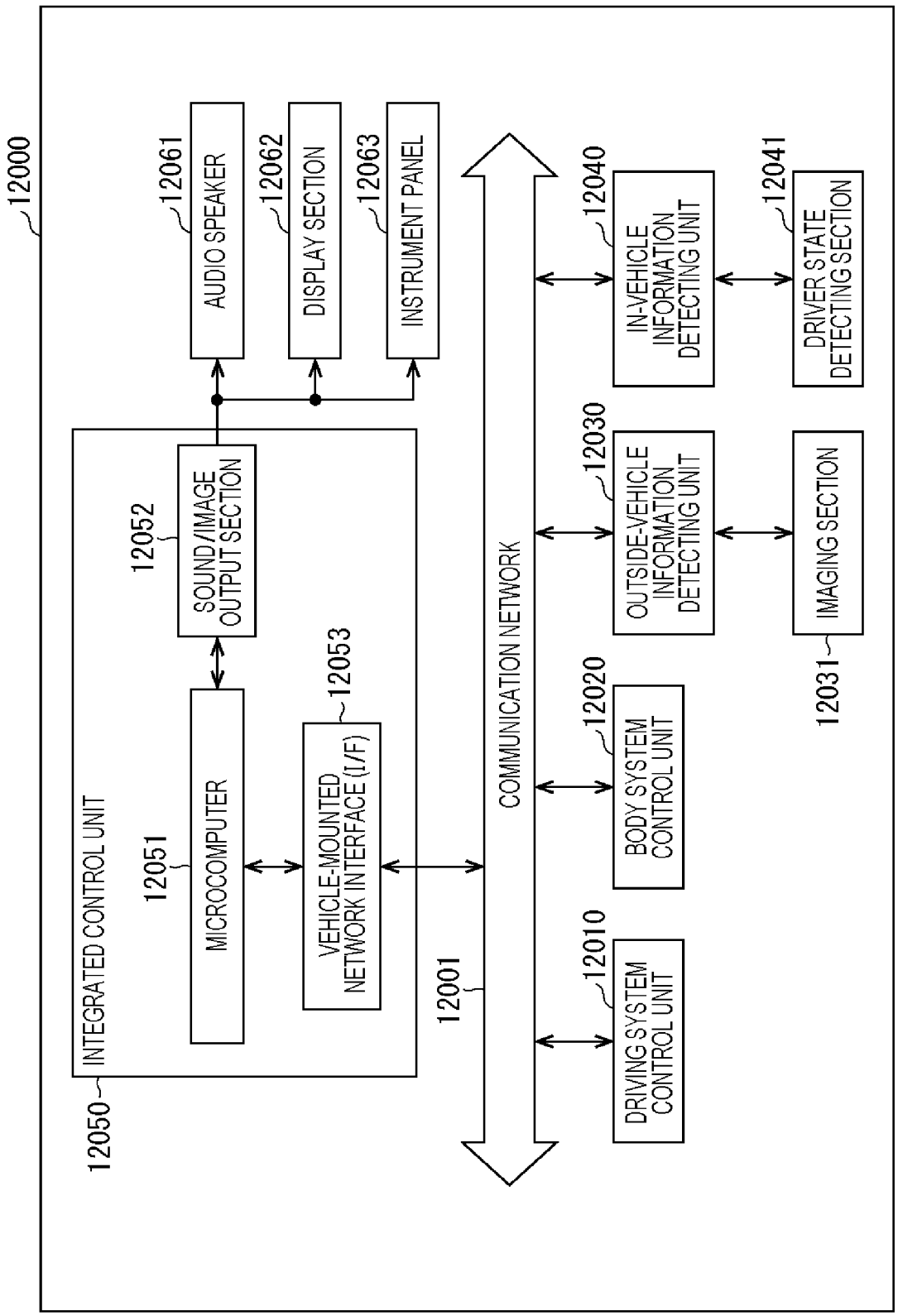
FIG. 23 is a block diagram illustrating an example of a schematic configuration of a vehicle control system.

FIG. 23 is a block diagram illustrating a schematic configuration example of a vehicle control system which is an example of a mobile object control system to which a technology according to an embodiment of the present technology is applicable.

The vehicle control system 12000 includes a plurality of electronic control units connected to each other via a communication network 12001. In the example depicted in FIG. 23, the vehicle control system 12000 includes a driving system control unit 12010, a body system control unit 12020, an outside-vehicle information detecting unit 12030, an in-vehicle information detecting unit 12040, and an integrated control unit 12050. In addition, as functional configurations of the integrated control unit 12050, a microcomputer 12051, a sound/image output section 12052, a vehicle-mounted network interface (I/F) 12053.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electrical signal corresponding to a received light amount of the light. The imaging section 12031 can output the electrical signal as an image, or can output the electrical signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether or not the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying an occupant of the vehicle or the outside of the vehicle of information. In the example of FIG. 23, an audio speaker 12061, a display section 12062, and an instrument panel 12063 are exemplified as the output device. The display section 12062 may, for example, include at least one of an on-board display or a head-up display.

Figure 24:
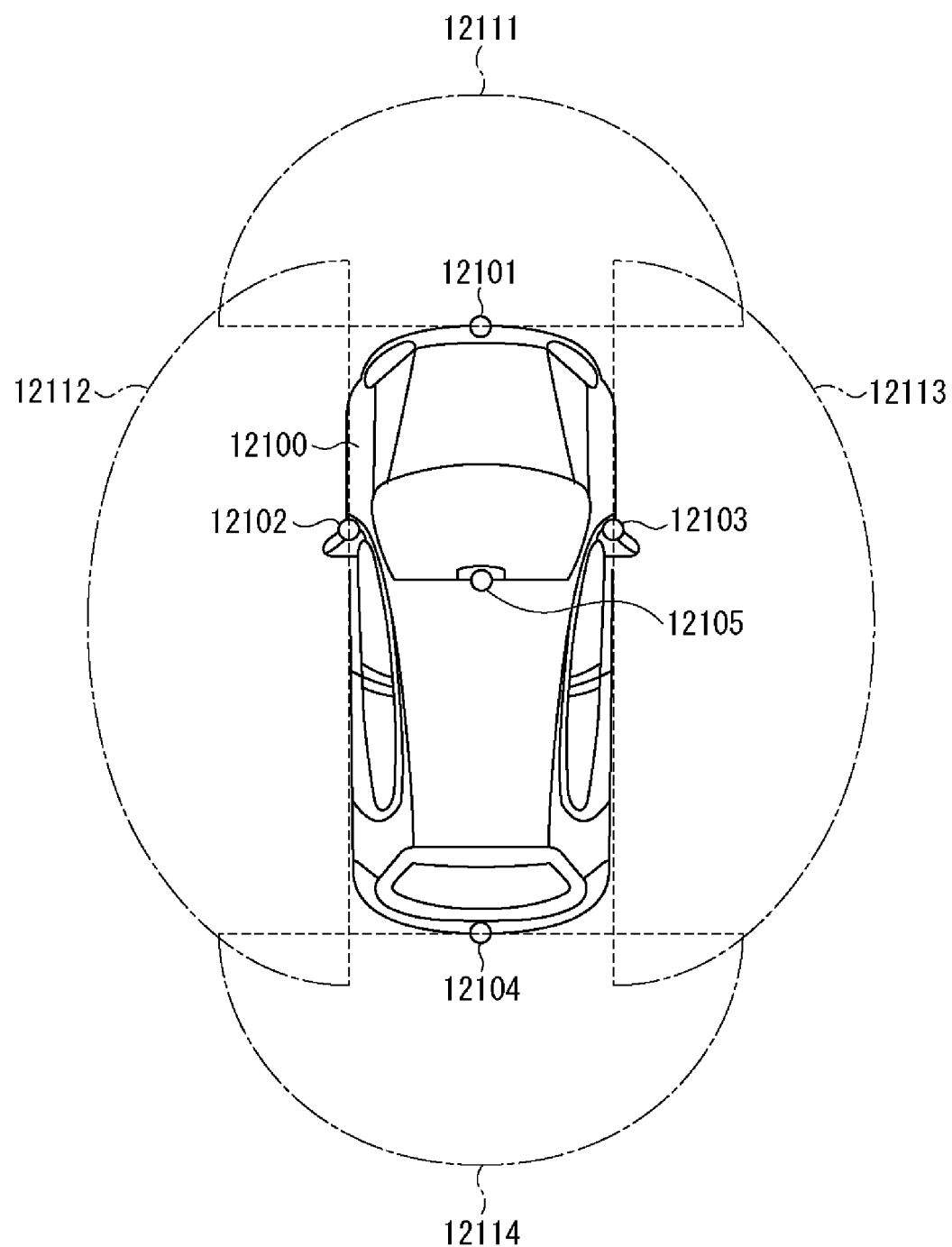
FIG. 24 is an explanatory diagram illustrating an example of installation positions of an outside-vehicle information detecting unit and the imaging section.

FIG. 24 is a diagram illustrating an example of an installation position of the imaging section 12031.

In FIG. 24, a vehicle 12100 includes imaging units 12101, 12102, 12103, 12104, and 12105 as the imaging section 12031.

Imaging sections 12101, 12102, 12103, 12104, and 12105 are positioned, for example, at the front nose, a side mirror, the rear bumper, the back door, and the upper part, or the like, of the windshield in the vehicle compartment of a vehicle 12100. The imaging section 12101 provided to the front nose and the imaging section 12105 provided to the upper portion of the windshield within the interior of the vehicle obtain mainly an image of the front of the vehicle 12100. The imaging sections 12102 and 12103 attached to the side mirrors chiefly acquire images of the areas on the sides of the vehicle 12100. The imaging section 12104 provided to the rear bumper or the back door obtains mainly an image of the rear of the vehicle 12100. The image of the front of the vehicle obtained by the imaging sections 12101 and 12105 is used mainly to detect a preceding vehicle, a pedestrian, an obstacle, a signal, a traffic sign, a lane, or the like.

Additionally, FIG. 24 illustrates an example of the imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/h).

Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, and other three-dimensional objects such as a utility pole on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. Further, the sound/image output section 12052 may also control the display section 12062 so that an icon or the like representing the pedestrian is displayed at a desired position.

The exemplary vehicle control system to which the technology according to the present disclosure is applicable is described above. The technology according to the present disclosure can be applied to the imaging section 12031, for example, within the above-described configuration. Specifically, the data processing chip illustrated in FIG. 1 can be applied to the imaging section 12031. The imaging section 12031 to which the technique according to the present disclosure is applied makes it possible to obtain appropriate frame data, thereby providing appropriate driving support by image processing on the obtained frame data.

<Setting Ways of Setting Inter-Frame Interval and Frame Width>

FIG. 25 is a diagram illustrating a list of setting ways of setting an inter-frame interval and a frame width.

The inter-frame interval and frame width setting ways of the present technology are described again with reference to FIG. 25.

In the third setting way (FIG. 14), the inter-frame interval and the frame width are set on the basis of time (by specifying it on the basis of time). In the fourth setting way (FIG. 19), the inter-frame interval is set on the basis of time, and the frame width is set on the basis of the number of event data (by specifying it on the basis of the number of event data). In the fifth setting way (FIG. 20), the inter-frame interval is set on the basis of the number of event data, and the frame width is set on the basis of time. In the sixth setting way (FIG. 21), the inter-frame interval and the frame width are set on the basis of the number of event data.

<Example of Frame Data Generated in Case of Setting One Frame Width for Entire Frame of Frame Data>

Figure 26:
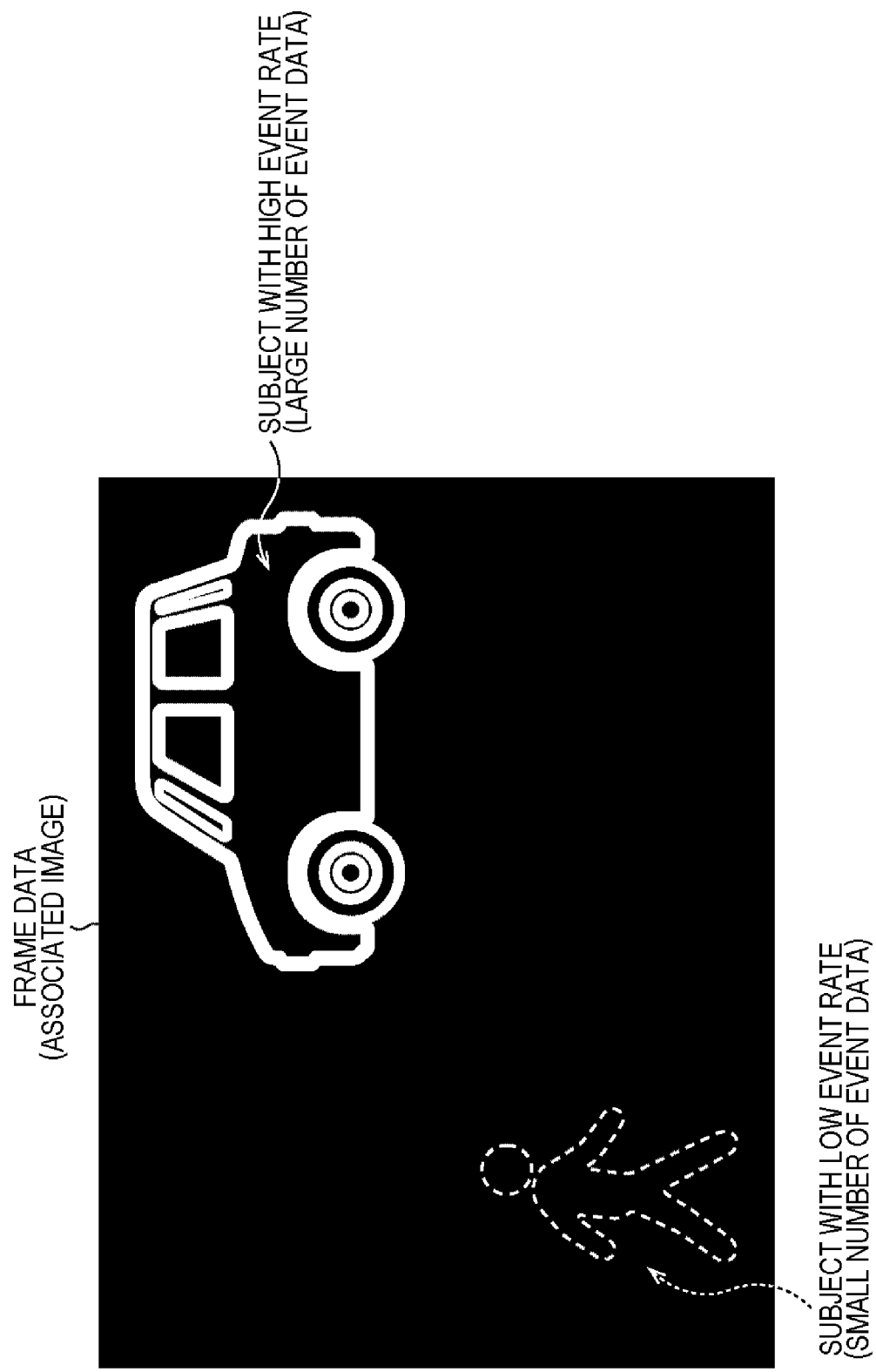
FIG. 26 is a diagram illustrating an example of frame data generated in a case of setting one frame width for the entire frame of frame data.

FIG. 26 is a diagram illustrating an example of frame data generated in a case of setting one frame width for the entire frame of frame data.

In FIG. 26, a subject with a high event rate (e.g., a subject moving at high speed) and a subject with a low event rate (e.g., a subject at extremely low speed or nearly stationary) indicating the occurrence frequency of events are mixed. There may be the case where one frame width is set for the entire frame, and a subject with a high event rate and a subject with a low event rate are mixed. In this case, the frame volume includes a large number of event data obtained from the subject with a high event rate and a small number of event data obtained from the subject with a low event rate.

For a subject that includes an excessively large number of event data in the frame volume, the contour of the subject appears blurred in the image associated with the frame data in some cases. On the other hand, for a subject that includes an excessively small number of event data in the frame volume, the contour of the subject does not appear clearly in the image associated with the frame data, and the visibility of the subject deteriorates in some cases. Furthermore, image recognition performed on such an image may cause unsatisfactory recognition performance.

Thus, it is possible to set the frame width in units of segmented regions in which the frame of the frame data is divided into a plurality of regions.

<Setting Frame Width in Units of Segmented Regions>

Figure 27:
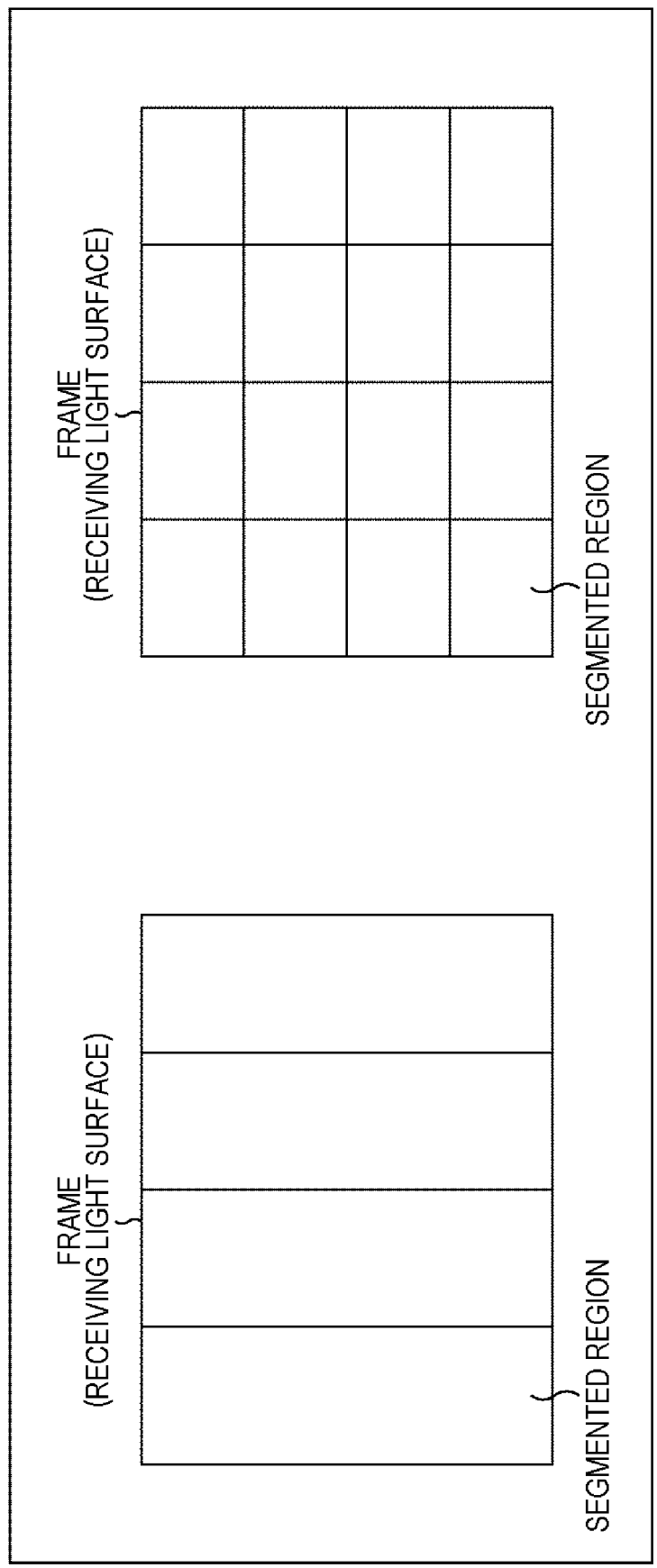
FIG. 27 is a diagram illustrating an example of how to divide a frame into segmented regions.

FIG. 27 is a diagram illustrating an example of how to divide a frame into segmented regions.

The frame can be divided into, in one example, four segmented regions that are equally in the horizontal direction. In addition, the frame can be divided into 4×4 segmented regions equally in the horizontal and vertical direction to be equally divided in the horizontal direction and in the vertical direction. The frame can be divided into segmented regions using other ways. In addition, the frame can be divided into a plurality of segmented regions having different sizes.

The frame width can be set for each segmented region.

Figure 28:
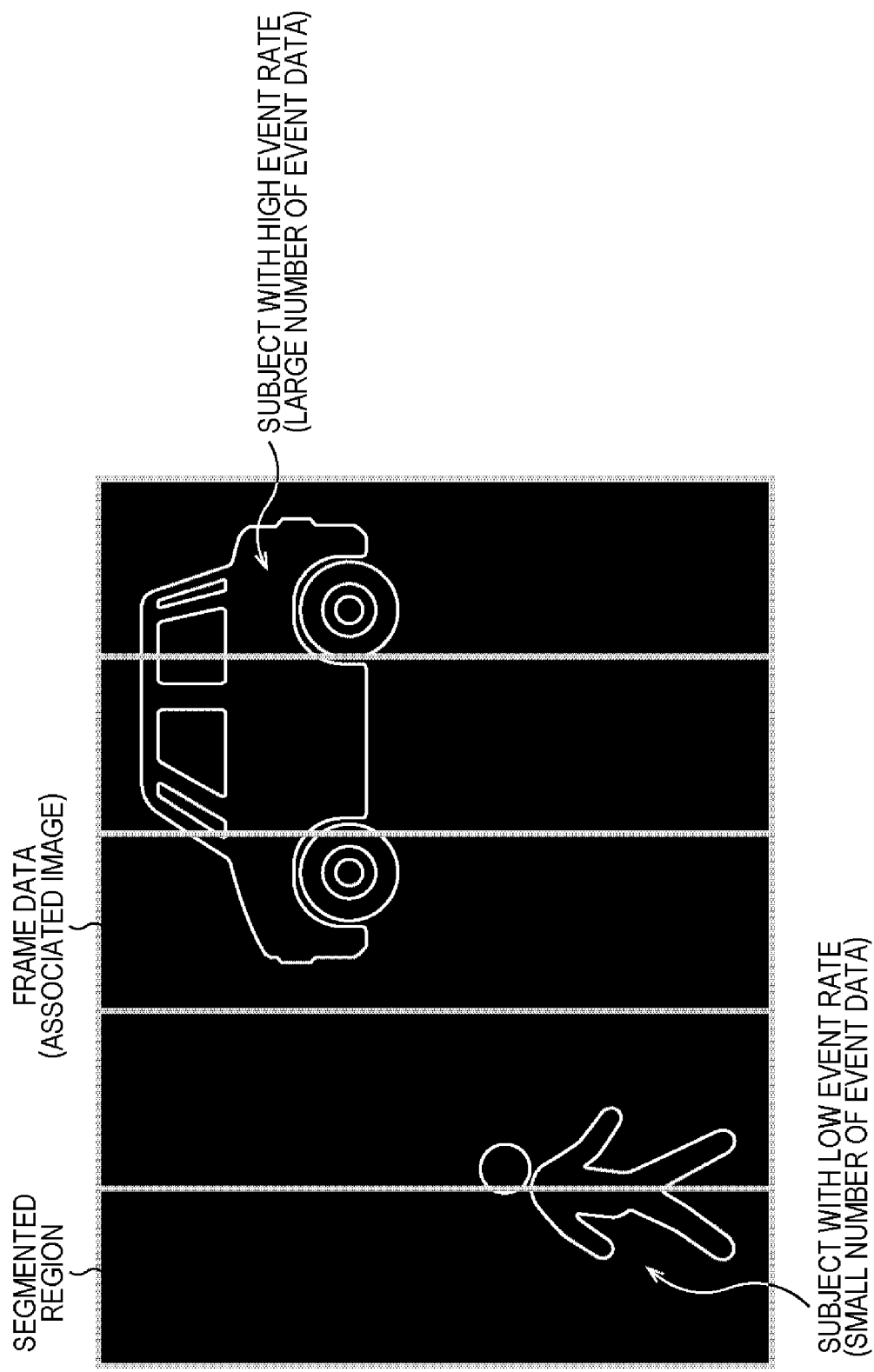
FIG. 28 is a diagram illustrating an example of frame data generated in a case of setting a frame width for each segmented region.

FIG. 28 is a diagram illustrating an example of frame data generated in a case of setting a frame width for each segmented region.

In FIG. 28, a subject with a high event rate and a subject with a low event rate are mixed, similarly to FIG. 26. Then, in FIG. 28, in one example, the time shorter than the predetermined time is set as the frame width in the segmented region in which the subject with a high event rate is projected. In addition, in one example, the time longer than the predetermined time is set as the frame width in the segmented region in which a subject with a low event rate is projected.

Consequently, in FIG. 28, event data for a subject with a high event rate and event data for a subject with a low event rate are included in the frame volume in a number with no difference. As a result, in the image associated with the frame data, for both subjects with a high event rate and a low event rate, the contours of the subjects appear clearly.

Thus, it is possible to improve the visibility of the subject projected in the image associated with the frame data. Furthermore, image recognition performed on the image associated with frame data enables satisfactory recognition performance to be obtained. Moreover, in the case where the frame width is set on the basis of the number of event data, in one example, for the segmented regions in which subjects with a high event rate and a low event rate are projected, it is possible to set the identical and appropriate number of event data as the frame width. In other words, it is possible to set, in one example, the number of event data in which the contour of the subject appears clearly as the frame width. In this case, the time as the frame width for the segmented region where the subject with a high event rate is projected is shorter than the time as the frame width for the segmented region where the subject with a low event rate is projected. The time as the frame width for the segmented region where the subject with a low event rate is projected is longer than the time as the frame width for the segmented region in which the subject with a high event rate is projected.

Figure 29:
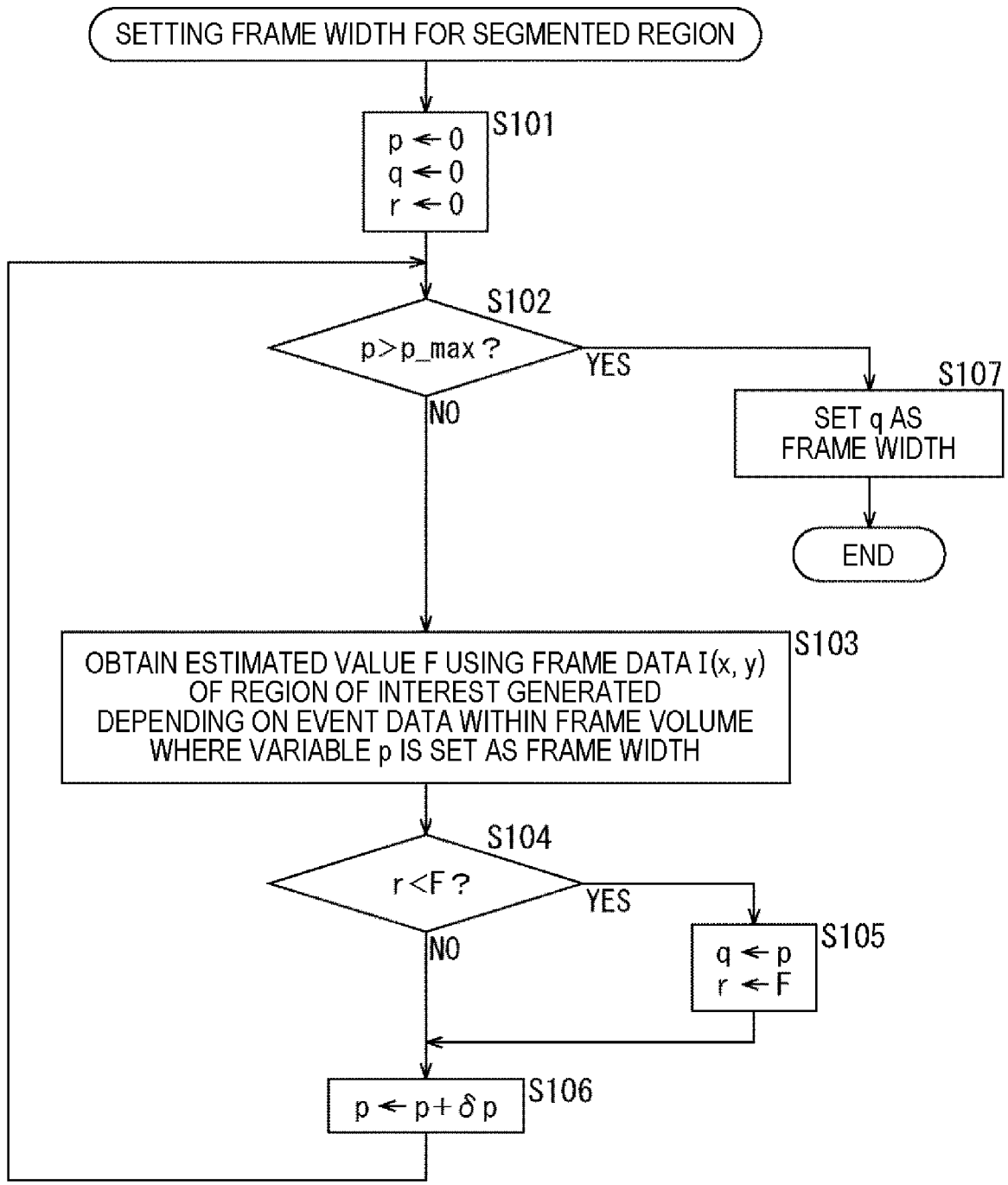
FIG. 29 is a flowchart illustrating an example of a setting way in a case of setting the number of event data using as a frame width for each segmented region.

FIG. 29 is a flowchart illustrating an example of a setting way in a case of setting the number of event data using as a frame width for each segmented region.

In this description, the segmented region for which the number of event data as the frame width is to be set is also referred to as a region of interest. FIG. 29 is a flowchart illustrating a way of setting the frame width of the region of interest.

It is possible to set the frame width of the region of interest depending on an estimated value F indicating the adequateness of the frame width. For the region of interest, it is possible to obtain the estimated value F depending on the frame data of the region of interest (an image corresponding thereto) generated in response to the event data in the frame volume of the frame width of the region of interest.

In setting the frame width of the region of interest, in step S101, the frame width setting unit 112 (FIG. 9) sets variables p, q, and r to zero as initial values, and the processing proceeds to step S102.

In this description, p is a variable representing a candidate for the number of event data as the frame width, and q is a variable representing the number of event data as the frame width. In addition, r is the estimated value F representing the adequateness of the frame width represented by the variable p (variable representing a candidate), that is, a variable representing the threshold of the estimated value F representing the adequateness of using the candidate p of the number of event data as the frame width (the number of event data as frame width).

In step S102, the frame width setting unit 112 determines whether or not the variable p is larger than the threshold p_max, which is the maximum value of the number of event data as the predetermined frame width. If it is determined in step S102 that the variable p is smaller than or equal to the threshold p_max, the processing proceeds to step S103.

In step S103, the frame width setting unit 112 sets the variable p, that is, the candidate p for the number of event data as the frame width, to the temporary frame width p. In addition, the frame width setting unit 112 obtains the estimated value F by using the frame data I(x, y) as the pixel value of each pixel of the region of interest generated depending on the event data in the frame volume of the temporary frame width p.

Then, the processing proceeds to step S104. Where, I(x, y) represents the pixel value of a pixel at the position (x, y) in the region of interest.

In step S104, the frame width setting unit 112 determines whether or not the estimated value F is larger than the threshold (variable representing the threshold) r. If it is determined in step S104 that the estimated value F is smaller than or equal to the threshold r, the processing skips step S105 and proceeds to step S106.

Further, if it is determined in step S104 that the estimated value F is larger than the threshold r, the processing proceeds to step S105. In step S105, the frame width setting unit 112 updates the variable q to the temporary frame width p and the threshold r to the estimated value F, and then the processing proceeds to step S106.

In step S106, the frame width setting unit 112 increments the variable p by a predetermined value δp. Then, the processing returns from step S106 to step S102, and the similar processing is repeated.

Then, if it is determined in step S102 that the variable p is larger than the threshold p_max, the processing proceeds to step S107. In step S107, the frame width setting unit 112 sets the variable q as the frame width of the region of interest, and the processing ends.

Moreover, the description above is given, in FIG. 29, of the setting way of setting the frame width specified on the basis of the number of event data for each segmented region, but the setting way of FIG. 29 is applicable to the case where the frame width specified on the basis of time is set for each segmented region. In the case where the frame width specified on the basis of the time is set for each segmented region, in FIG. 29, the variable p represents a time candidate as the frame width, and the variable q represents the time as the frame width. In addition, p_max represents the maximum value of time as a predetermined frame width.

Figure 30:
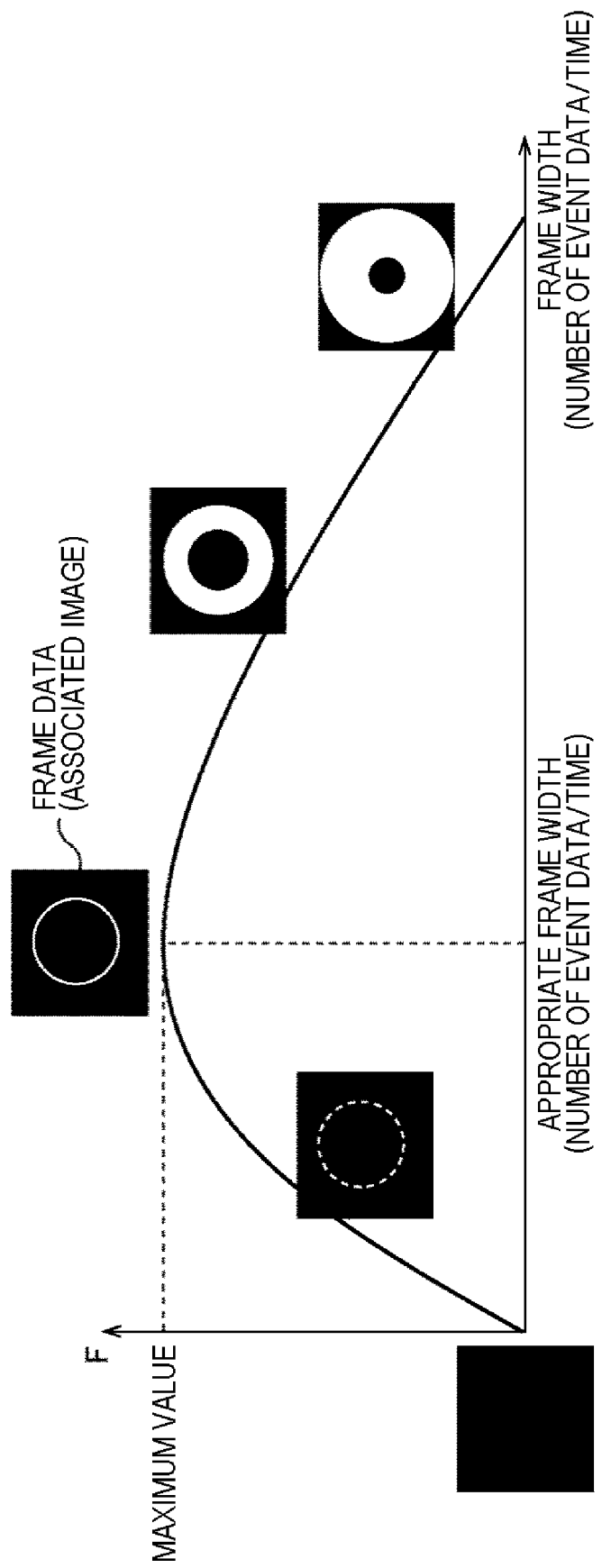
FIG. 30 is a diagram illustrating an example of an estimated value F.

FIG. 30 is a diagram illustrating an example of an estimated value F.

In FIG. 30, the horizontal axis represents the number of event data or time as the frame width, and the vertical axis represents the estimated value F.

Examples of the estimated value F can employ, as illustrated in FIG. 30, a function having a large value in the case where the number of event data or the time as the frame width of the region of interest is an appropriate value.

The case where the number of event data as the frame width of the region of interest is appropriate means that the contour of a subject appears clearly. Specifically, it means that, in the region of interest, the subject's contour is not in a state where the subject's contour of appears unsatisfactorily because the number of event data is too small, and the subject's contour is not in a state where the subject's contour is blurred because the number of event data is too large.

Examples of the estimated value F can employ a value (function) that increases in the case where a line having the width of one or a plurality of pixels exists in the region of interest. Specifically, the following values can be employed as the estimated value F.

Matrices $A_X$ and $A_Y$ are expressed by Formula (7).

[Math. 1]

$$A_X = \begin{pmatrix} a_X(-1,-1) & a_X(0,-1) & a_X(1,-1) \\ a_X(-1,0) & a_X(0,0) & a_X(1,0) \\ a_X(-1,1) & a_X(0,1) & a_X(1,1) \end{pmatrix} = \begin{pmatrix} -1 & 2 & -1 \\ -1 & 2 & -1 \\ -1 & 2 & -1 \end{pmatrix} \quad (7)$$

$$A_Y = \begin{pmatrix} a_Y(-1,-1) & a_Y(0,-1) & a_Y(1,-1) \\ a_Y(-1,0) & a_Y(0,0) & a_Y(1,0) \\ a_Y(-1,1) & a_Y(0,1) & a_Y(1,1) \end{pmatrix} = \begin{pmatrix} -1 & -1 & -1 \\ 2 & 2 & 2 \\ -1 & -1 & -1 \end{pmatrix}$$

Further, $f_X(x, y)$ and $f_Y(x, y)$ are expressed by Formula (8).

[Math. 2]

$$f_X(x, y) = \sum_{i=-1}^{1} \sum_{j=-1}^{1} I(x+i, y+j) a_X(i, j) \quad (8)$$

$$f_Y(x, y) = \sum_{i=-1}^{1} \sum_{j=-1}^{1} I(x+i, y+j) a_Y(i, j)$$

The absolute values of $f_X(x, y)$ and $f_Y(x, y)$ are large in the case where there is a line with a width of one pixel in the vertical and horizontal directions, respectively. The estimated value F can be expressed by, for example, Formula (9).

[Math. 3]

$$F = \sum_x \sum_y \sqrt{f_X(x, y)^2 + f_Y(x, y)^2} \quad (9)$$

The summation of Formula (9) is taken for pixels in the region of interest.

Moreover, the values of each element of the matrices $A_X$ and $A_Y$ are not limited to Formula (7). Furthermore, the number of elements and the configuration (dimension) of the matrices $A_X$ and $A_Y$ are not limited to the elements having horizontal and vertical lines of 3-by-3. Furthermore, the estimated value F is not limited to a value obtained by summing the square roots of the sum of the squares of each of $f_X(x, y)$ and $f_Y(x, y)$ as expressed in Formula (9). Examples of the estimated value F can employ a value obtained by summing the sums of the squares of each of $f_X(x, y)$ and $f_Y(x, y)$ as expressed in Formula (10). In addition, in one example, the estimated value F can be obtained by a summation of values obtained by adding $f_X(x, y)$ and $f_Y(x, y)$ themselves as expressed in Formula (11), a summation of values obtained by selecting the larger of $f_X(x, y)$ and $f_Y(x, y)$ as expressed in Formula (12), or the like. In addition, the estimated value F can be designed to take the maximum value (or minimum value) when the desired image (such as line width) is obtained as an image associated with the frame data generated depending on the event data.

[Math. 4]

$$F = \sum_x \sum_y (f_X(x, y)^2 + f_Y(x, y)^2) \quad (10)$$

[Math. 5]

$$F = \sum_x \sum_y (f_X(x, y) + f_Y(x, y)) \quad (11)$$

[Math. 6]

$$F = \sum_x \sum_y \max(f_X(x, y) + f_Y(x, y)) \quad (12)$$

<Another Exemplary Configuration of Event Detector 52>

Figure 31:
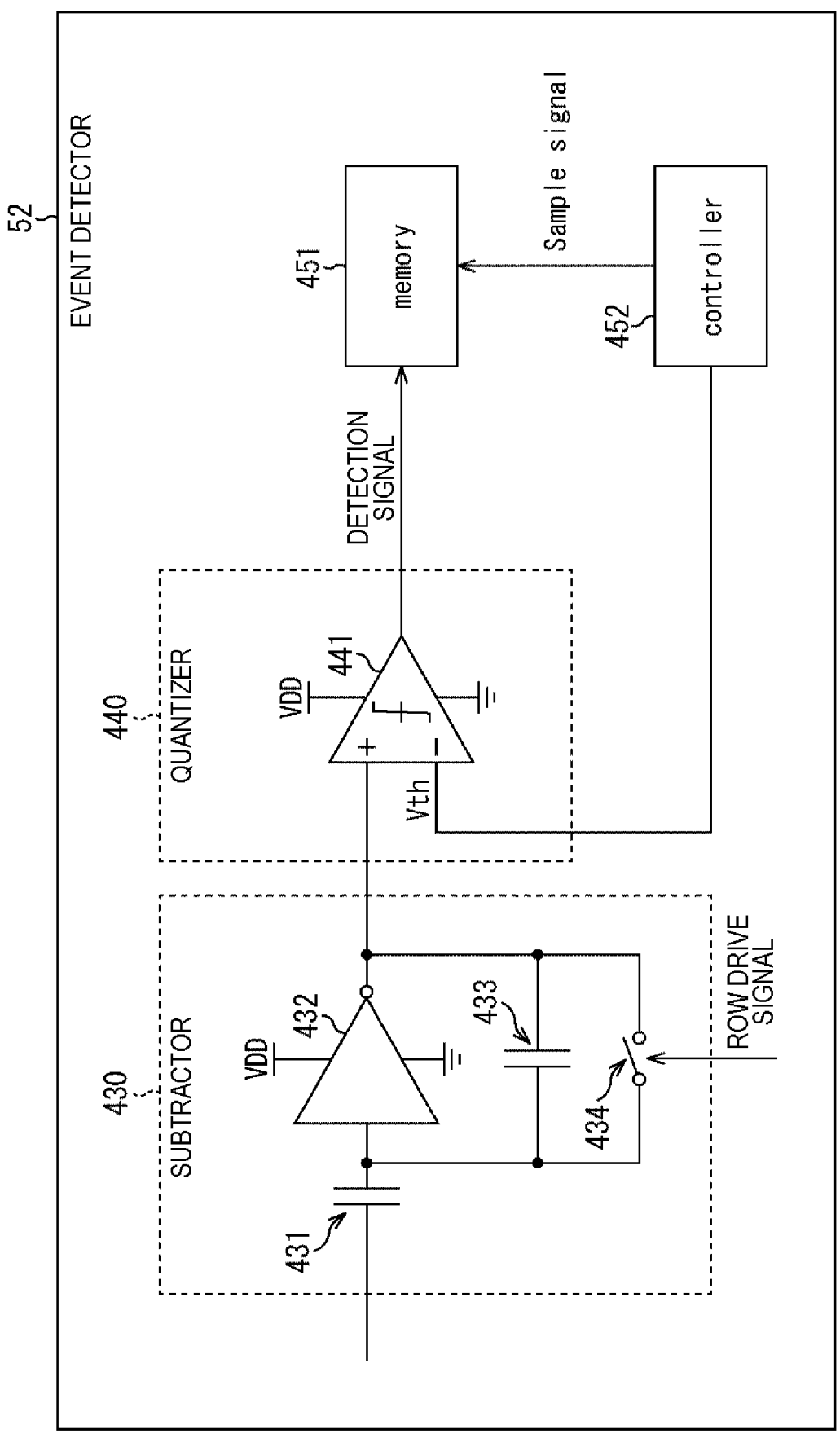
FIG. 31 is a diagram illustrating another exemplary configuration of the event detector 52.

FIG. 31 is a diagram illustrating another exemplary configuration of the event detector 52.

In FIG. 31, the event detector 52 has a subtractor 430, a quantizer 440, a memory 451, and a controller 452. The subtractor 430 and the quantizer 440 correspond to the subtractor 73 and the quantizer 74, respectively.

Moreover, in FIG. 31, the event detector 52 further has blocks corresponding to the current-to-voltage converter 71 and the buffer 72, but their illustration is omitted in FIG. 31.

The subtractor 430 has a capacitor 431, an operational amplifier 432, a capacitor 433, and a switch 434. The capacitors 431 to the switch 434 correspond to the capacitors 91 to the switch 94, respectively.

The quantizer 440 has a comparator 441. The comparator 441 corresponds to the comparator 101.

The comparator 441 compares the voltage signal (difference signal) from the subtractor 430 with the predetermined threshold voltage Vth applied to the inverting input terminal (−). The comparator 441 outputs a signal indicating the comparison result as a detection signal (quantized value).

The voltage signal from the subtractor 430 can be input to the input terminal (−) of the comparator 441 and the predetermined threshold voltage Vth can be input to the input terminal (+) of the comparator 441.

The controller 452 supplies the predetermined threshold voltage Vth to be applied to the inverting input terminal (−) of the comparator 441. The threshold voltage Vth to be supplied can have different voltage values in time division. In one example, the controller 452 is capable of detecting a plurality of types of address events (event) with one comparator by supplying a threshold voltage Vth1 corresponding to an ON event (e.g., positive variation in photocurrent) and a threshold voltage Vth2 corresponding to an OFF event (e.g., negative variation in photocurrent) at different timings.

The memory 451 accumulates the outputs of the comparator 441 on the basis of a sample signal supplied from the controller 452. The memory 451 can be a sampling circuit such as a switch, plastic, or capacitance, or can be a digital memory circuit such as a latch or flip-flop. In one example, the memory 451 can hold the comparison result of the comparator 441 using the threshold voltage Vth1 corresponding to the ON event during the period when the threshold voltage Vth2 corresponding to the OFF event is supplied to the inverting input terminal (−) of the comparator 441. Moreover, the memory 451 is not necessarily provided, can be provided in the pixel (the pixel block 41), or can be provided outside the pixel.

<Scanning Method>

The data processing chip of FIG. 1 is an asynchronous image-capturing device that reads an event by an asynchronous readout method. However, the event readout method is not limited to the asynchronous readout method, and can be a synchronous readout method. The image-capturing device to which the synchronous readout method is applied is a scanning type image-capturing device, which is the same as a normal image-capturing device that performs image-capturing at a predetermined frame rate.

Figure 32:
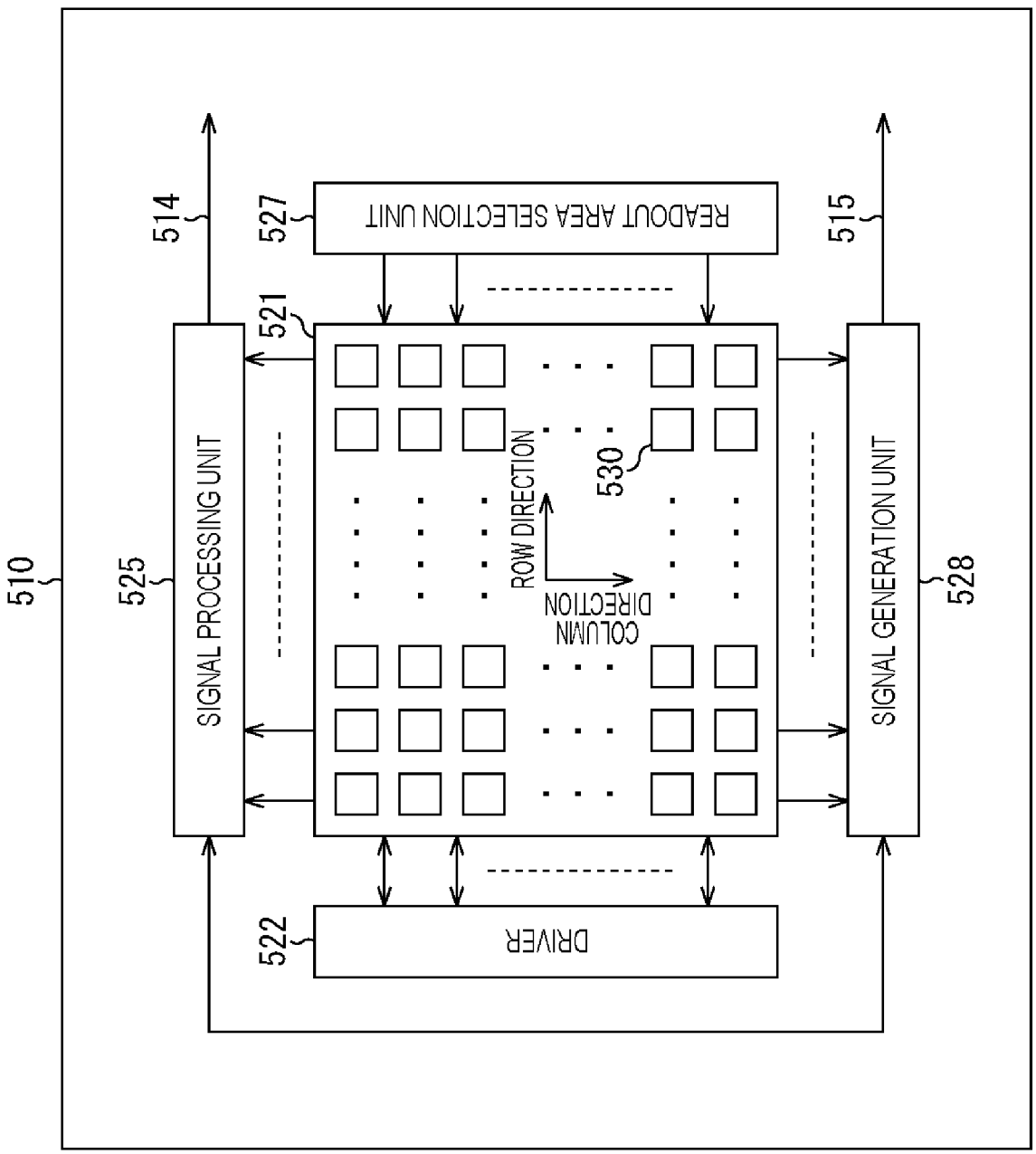
FIG. 32 is a block diagram illustrating an exemplary configuration of a scanning type image-capturing device.

FIG. 32 is a block diagram illustrating an exemplary configuration of a scanning type image-capturing device.

As illustrated in FIG. 32, the image-capturing device 510 includes a pixel array section 521, a driver 522, a signal processing unit 525, a readout area selection unit 527, and a signal generation unit 528.

The pixel array section 521 includes a plurality of pixels 530. The plurality of pixels 530 outputs an output signal in response to the selection signal of the readout area selection unit 527. Each of the plurality of pixels 530 can be provided with a quantizer in the pixel, for example, as illustrated in FIG. 31. The plurality of pixels 530 outputs an output signal corresponding to the amount of variation in light intensity. The plurality of pixels 530 can be two-dimensionally arranged in a matrix, as illustrated in FIG. 32.

The driver 522 drives each of the plurality of pixels 530 to cause the signal processing unit 525 to output the pixel signal generated in each pixel 530 through the output line 514. Moreover, the driver 522 and the signal processing unit 525 are circuit units configured to acquire gradation information. Thus, in the case where only the event information (event data) is acquired, the driver 522 and the signal processing unit 525 can be omitted.

The readout area selection unit 527 selects a part of the plurality of pixels 530 included in the pixel array section 521. In one example, the readout area selection unit 527 selects any one or a plurality of rows among rows included in the two-dimensional matrix structure corresponding to the pixel array section 521. The readout area selection unit 527 sequentially selects one or a plurality of rows depending on a preset period. In addition, the readout area selection unit 527 can determine the selection area in response to a request from each pixel 530 of the pixel array section 521.

The signal generation unit 528 generates an event signal corresponding to an active pixel in which an event is detected among the selected pixels 530 on the basis of the output signal of the pixel 530 selected by the readout area selection unit 527. The event herein is an event in which the intensity of light changes. The active pixel is the pixel 530 in which the amount of variation in light intensity corresponding to the output signal exceeds or falls below a preset threshold. In one example, the signal generation unit 528 compares the output signal of the pixel 530 with a reference signal, detects an active pixel that outputs the output signal in the case where it is larger or smaller than the reference signal, and generates an event signal (event data) corresponding to the active pixel.

The signal generation unit 528 can have a configuration to include, in one example, a column selection circuit that arbitrates signals entering the signal generation unit 528. In addition, the signal generation unit 528 is capable of outputting not only the information of the active pixel in which the event is detected but also the information of the inactive pixel in which the event is not detected.

The signal generation unit 528 outputs the address information and timestamp information (e.g., (X, Y, T)) of the active pixel in which the event is detected through the output line 515. However, the data output from the signal generation unit 528 can be frame format information (e.g., (0, 0, 1, 0, . . . )) as well as address information and timestamp information.

In addition, an embodiment of the present technology is not limited to the embodiments described above, and various changes and modifications may be made without departing from the scope of the present technology.

Further, each step described by the above-mentioned flowcharts can be executed by one apparatus or by allocating a plurality of apparatuses.

In addition, in the case where a plurality of processes is included in one step, the plurality of processes included in this one step can be executed by one apparatus or by sharing a plurality of apparatuses.

Furthermore, the effects described in this specification are merely examples and are not limited, and other effects may be exerted.

Additionally, the present technology may be configured as below.

<1>

A data processing device including:

a frame data generation unit configured to generate first frame data and second frame data, the first frame data being based on event data indicating a variation in an electrical signal of a pixel generating the electrical signal by performing photoelectric conversion, the event data occurring during a first accumulation time from a first frame generation start time to a first frame generation end time, and the second frame data being based on event data occurring during a second accumulation time from a second frame generation start time to a second frame generation end time; and a frame period setting unit configured to set and supply a first frame period to the frame data generation unit, the first frame period being a period from the first frame generation start time to the second frame generation start time.

<2>

The data processing device according to <1>, in which the frame data generation unit further generates third frame data based on event data occurring during a third accumulation time from a third frame generation start time to a third frame generation end time, and the frame period setting unit sets the first frame period and a second frame period to be different from each other, the second frame period being a period from the second frame generation start time to the third frame generation start time.

<3>

The data processing device according to <1> or <2>, further including:

an accumulation time setting unit configured to set and supply the first accumulation time and the second accumulation time to the frame data generation unit.

<4>

The data processing device according to <3>, in which the accumulation time setting unit sets the first accumulation time and the second accumulation time to be different from each other.

<5>

A data processing device including:

a frame data generation unit configured to generate frame data on the basis of event data indicating a variation in an electrical signal of a pixel generating the electrical signal by performing photoelectric conversion, the event data occurring during an accumulation time from a frame generation start time to a frame generation end time; and a frame period setting unit configured to set and supply a frame period indicating an interval between a frame data generation start time of first frame data and a frame data generation start time of second frame data to the frame data generation unit, the second frame data being generated consecutively with the first frame data.

<6>

The data processing device according to <5>, further including:

an accumulation time setting unit configured to set and supply the accumulation time to the frame data generation unit.

<7>

The data processing device according to <5> or <6>, in which the frame period setting unit sets the frame period on the basis of time.

<8>

The data processing device according to <6>, in which the accumulation time setting unit sets the accumulation time on the basis of time.

<9>

The data processing device according to <6>, in which the accumulation time setting unit sets the accumulation time depending on a number of the event data.

<10>

The data processing device according to <6>, in which the accumulation time setting unit switches between setting the accumulation time on the basis of time and setting the accumulation time depending on a number of the event data.

<11>

The data processing device according to <5>, in which the frame period setting unit sets the frame period depending on a number of the event data.

<12>

The data processing device according to <11>, further including:

an accumulation time setting unit configured to set and supply the accumulation time to the frame data generation unit, in which the accumulation time setting unit sets the accumulation time on the basis of time.

<13>

The data processing device according to <11>, further including:

an accumulation time setting unit configured to set and supply the accumulation time to the frame data generation unit, in which the accumulation time setting unit sets the accumulation time depending on the number of the event data.

<14>

The data processing device according to <11>, further including:

an accumulation time setting unit configured to set and supply the accumulation time to the frame data generation unit, in which the accumulation time setting unit switches between setting the accumulation time on the basis of time and setting the accumulation time depending on the number of the event data.

<15>

The data processing device according to <5> or <6>, in which the frame period setting unit switches between setting the frame period on the basis of time and setting the frame period depending on a number of the event data.

<16>

A data processing method including:

generating, by a frame data generation unit, frame data on the basis of event data indicating a variation in an electrical signal of a pixel generating the electrical signal by performing photoelectric conversion, the event data occurring during an accumulation time from a frame generation start time to a frame generation end time; and setting and supplying a frame period indicating an interval between a frame data generation start time of first frame data and a frame data generation start time of second frame data to the frame data generation unit, the second frame data being generated consecutively with the first frame data.

<17>

A program for causing a computer to function as:

a frame data generation unit configured to generate frame data on the basis of event data indicating a variation in an electrical signal of a pixel generating the electrical signal by performing photoelectric conversion, the event data occurring during an accumulation time from a frame generation start time to a frame generation end time; and a frame period setting unit configured to set and supply a frame period indicating an interval between a frame data generation start time of first frame data and a frame data generation start time of second frame data to the frame data generation unit, the second frame data being generated consecutively with the first frame data.

<18>

A data processing device including:

a frame data generation unit configured to generate first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time.

<19>

A data processing method including:

generating first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time.

<20>

A program for causing a computer to function as:

a frame data generation unit configured to generate first frame data and second frame data in such a way that a first accumulation time and a second accumulation time overlap, the first frame data being based on event data indicating a variation in an electrical signal of a pixel generating the electrical signal by performing photoelectric conversion, the event data occurring during the first accumulation time from a first frame generation start time to a first frame generation end time, and the second frame data being based on the event data occurring during the second accumulation time from a second frame generation start time to a second frame generation end time.

<21>

A data processing device for generating frame data on the basis of event data indicating a variation in an electrical signal of a pixel generating the electrical signal by performing photoelectric conversion, the event data occurring during an accumulation time from a frame generation start time to a frame generation end time, in which a number of the frame data to be generated per unit time varies depending on a number of the event data per unit time.

<22>

The data processing device according to <21>, in which the larger the number of the event data per unit time, the larger the number of the frame data to be generated per unit time.

<23>

A data processing device including:

a data processing unit including, an event generation unit having a pixel generating an electrical signal by performing photoelectric conversion, configured to generate event data representing occurrence of an event indicating a variation in the electrical signal of the pixel, a frame data generation unit configured to generate frame data on the basis of the event data occurring during an accumulation time from a frame generation start time to a frame generation end time, and a frame period setting unit configured to set and supply a frame period indicating an interval between a frame data generation start time of first frame data and a frame data generation start time of second frame data to the frame data generation unit, the second frame data being generated consecutively with the first frame data.

<24>

The data processing device according to <23>, further including:

an image processing unit configured to perform image processing using the frame data.

<25>

The data processing device according to <24>, in which the image processing unit performs recognition processing on the frame data.

<26>

The data processing device according to any one of <23> to <25>, in which the data processing device includes a semiconductor chip having a plurality dies arranged on top of each other.

<27>

A data processing method including:

generating event data representing occurrence of an event indicating a variation in an electrical signal of a pixel generating the electrical signal by performing photoelectric conversion;

generating, by a frame data generation unit, frame data on the basis of the event data occurring during an accumulation time from a frame generation start time to a frame generation end time; and setting and supplying a frame period indicating an interval between a frame data generation start time of first frame data and a frame data generation start time of second frame data to the frame data generation unit, the second frame data being generated consecutively with the first frame data.

<28>

The data processing device according to any one of <6>, <8>, <9>, <12>, or <13>, in which the accumulation time setting unit sets the accumulation time in units of segmented regions obtained by dividing a frame of the frame data into a plurality of regions.

<29>

The data processing device according to <28>, in which the accumulation time setting unit sets the accumulation time depending on an estimated value indicating adequateness of the accumulation time.

<30>

The data processing device according to <29>, in which the accumulation time setting unit sets the accumulation time depending on the estimated value obtained by using the frame data generated depending on the event data within the accumulation time.

<A1>

A data processing device including an inter-frame interval setting unit configured to set an inter-frame interval indicating an interval of a frame; and a data generation unit configured to generate frame data that is image data in a frame format of the inter-frame interval depending on event data representing occurrence of an event indicating a variation in an electrical signal of a pixel generating the electrical signal by performing photoelectric conversion.

<A2>

The data processing device according to <A1> further including a frame width setting unit configured to set a frame width representing a time width of the event used to generate the frame data, in which the data generation unit generates the frame data from a head of the inter-frame interval depending on the event data within the frame width.

<A3>

The data processing device according to <A2>, in which the inter-frame interval setting unit sets the inter-frame interval on the basis of time.

<A4>

The data processing device according to <A2> or <A3>, in which the frame width setting unit sets the frame width on the basis of time.

<A5>

The data processing device according to <A2> or <A3>, in which the frame width setting unit sets the frame width depending on the number of the event data.

<A6>

The data processing device according to <A3>, in which the frame width setting unit switches between setting the frame width on the basis of time and setting the frame width depending on the number of the event data.

<A7>

The data processing device according to <A2>, in which the inter-frame interval setting unit sets the inter-frame interval depending on the number of the event data.

<A8>

The data processing device according to <A2> or <A7>, in which the frame width setting unit sets the frame width on the basis of time.

<A9>

The data processing device according to <A2> or <A7>, in which the frame width setting unit sets the frame width depending on a number of the event data.

<A10>

The data processing device according to <A7>, in which the frame width setting unit switches between setting the frame width on the basis of time and setting the frame width depending on a number of the event data.

<A11>

The data processing device according to <A1> or <A2>, in which the inter-frame interval setting unit switches between setting the inter-frame interval on the basis of time and setting the inter-frame interval depending on a number of the event data.

<A12>

A data processing method including setting an inter-frame interval representing an interval of a frame; and generating frame data that is image data in a frame format of the inter-frame interval depending on event data representing occurrence of an event indicating a variation in an electrical signal of a pixel generating the electrical signal by performing photoelectric conversion.

<A13>

A program for causing a computer to function as an inter-frame interval setting unit configured to set an inter-frame interval indicating an interval of a frame; and a data generation unit configured to generate frame data that is image data in a frame format of the inter-frame interval depending on event data representing occurrence of an event indicating a variation in an electrical signal of a pixel generating the electrical signal by performing photoelectric conversion.

<A14>

A data processing device including a data generation unit configured to generate frame data that is image data in a frame format depending on event data representing occurrence of an event indicating a variation in an electrical signal of a pixel generating the electrical signal by performing photoelectric conversion, the frame data sharing the same event data between adjacent frames.

<A15>

A data processing method including generating frame data that is image data in a frame format depending on event data representing occurrence of an event indicating a variation in an electrical signal of a pixel generating the electrical signal by performing photoelectric conversion, the frame data sharing the same event data between adjacent frames.

<A16>

A program for causing a computer to function as a data generation unit configured to generate frame data that is image data in a frame format depending on event data representing occurrence of an event indicating a variation in an electrical signal of a pixel generating the electrical signal by performing photoelectric conversion, the frame data sharing the same event data between adjacent frames.

<A17>

A data processing device including an event generation unit having a pixel generating an electrical signal by performing photoelectric conversion, configured to generate event data representing occurrence of an event indicating a variation in the electrical signal of the pixel;

an inter-frame interval setting unit configured to set an inter-frame interval indicating an interval of a frame; and a data generation unit configured to generate frame data that is image data in a frame format of the inter-frame interval depending on the event data.

<A18>

The data processing device according to <A17>, further including:

an image processing unit configured to perform image processing using the frame data.

<A19>

The data processing device according to <A18>, in which the image processing unit performs recognition processing on the frame data.

<A20>

The data processing device according to any one of <A17> to <A19>, in which the data processing device includes a semiconductor chip having a plurality dies arranged on top of each other.

<A21>

A data processing method including generating event data representing occurrence of an event indicating a variation in an electrical signal of a pixel generating the electrical signal by performing photoelectric conversion;

setting an inter-frame interval indicating an interval of a frame; and generating frame data that is image data in a frame format of the inter-frame interval depending on the event data.

<A22>

The data processing device according to any one of <A4>, <A5>, <A8>, or <A9> in which the frame width setting unit sets the frame width in units of segmented regions obtained by dividing a frame of the frame data into a plurality of regions.

<A23>

The data processing device according to <A22>, in which the frame width setting unit sets the frame width depending on an estimated value indicating adequateness of the frame width.

<A24>

The data processing device according to <A23>, in which the frame width setting unit sets the frame width depending on the estimated value obtained by using the frame data generated depending on the event data within the frame width.

REFERENCE SIGNS LIST

11 Sensor die
12 Logic die
21 Event generation unit

22 Data processing unit
31 Pixel array section
32 Driver
33 Arbiter
34 Output unit
41 Pixel block
51 Pixel
52 Event detector
60 Node
61 Photoelectric transducer
62 Transfer transistor
71 Current-to-voltage converter
72 Buffer
73 Subtractor
74 Quantizer
75 Transfer unit
81 to 83 Transistor
91 Capacitor
92 Operational amplifier
93 Capacitor
94 Switch
101 Comparator
111 Inter-frame interval setting unit
112 Frame width setting unit
113 Data generation unit
114 Image processing unit
121 Memory
122 Memory control unit
123 Frame data generation unit
124 Acquisition unit
901 Bus
902 CPU
903 ROM
904 RAM

What is claimed is:

1. A data processing device, comprising:
a frame data generation unit configured to generate first frame data and second frame data, the first frame data being based on event data indicating a variation in an electrical signal of a pixel generating the electrical signal by performing photoelectric conversion, the event data occurring during a first accumulation time from a first frame generation start time to a first frame generation end time, and the second frame data being based on event data occurring during a second accumulation time from a second frame generation start time to a second frame generation end time;
a frame period setting unit configured to set and supply a first frame period to the frame data generation unit, the first frame period being a period from the first frame generation start time to the second frame generation start time; and
an accumulation time setting unit configured to set and supply the first accumulation time and the second accumulation time to the frame data generation unit,
wherein the accumulation time setting unit is further configured to switch between setting the first and second accumulation times on a basis of time and setting the first and second accumulation times depending on a number of the event data in response to a user operation, and
wherein the accumulation time setting unit sets the first and second accumulation times in units of segmented regions, the segmented regions obtained by dividing a frame of each of the first and second frame data into a plurality of regions, based on a corresponding plurality of objects within the frame.

2. The data processing device according to claim 1, wherein
the frame data generation unit further generates third frame data based on event data occurring during a third accumulation time from a third frame generation start time to a third frame generation end time, and
the frame period setting unit sets the first frame period and a second frame period to be different from each other, the second frame period being a period from the second frame generation start time to the third frame generation start time.

3. The data processing device according to claim 1, wherein the accumulation time setting unit sets the first accumulation time and the second accumulation time to be different from each other.

4. The data processing device according to claim 1, wherein the accumulation time setting unit sets the accumulation time depending on an estimated value indicating adequateness of the accumulation time.

5. The data processing device according to claim 4, wherein the accumulation time setting unit sets the accumulation time depending on the estimated value obtained by using the frame data generated depending on the event data within the accumulation time.

6. The data processing device according to claim 1, further comprising:
an image processing unit configured to perform image processing using the first and second frame data.

7. The data processing device according to claim 6, wherein the image processing unit performs recognition processing on the first and second frame data.

8. A data processing device, comprising:
a frame data generation unit configured to generate frame data on a basis of event data indicating a variation in an electrical signal of a pixel generating the electrical signal by performing photoelectric conversion, the event data occurring during an accumulation time from a frame generation start time to a frame generation end time;
a frame period setting unit configured to set and supply a frame period indicating an interval between a frame data generation start time of first frame data and a frame data generation start time of second frame data to the frame data generation unit, the second frame data being generated consecutively with the first frame data; and
an accumulation time setting unit configured to set and supply the accumulation time to the frame data generation unit,
wherein the accumulation time setting unit is further configured to switch between setting the accumulation time on a basis of time and setting the accumulation time depending on a number of the event data in response to a user operation, and
wherein the accumulation time setting unit sets the accumulation time in units of segmented regions, the segmented regions obtained by dividing a frame of the frame data into a plurality of regions, based on a corresponding plurality of objects within the frame.

9. The data processing device according to claim 8, further comprising:
an image processing unit configured to perform image processing using the frame data.

10. The data processing device according to claim 9, wherein the image processing unit performs recognition processing on the frame data.

11. A data processing method, comprising:
generating, by a frame data generation unit, frame data on a basis of event data indicating a variation in an electrical signal of a pixel generating the electrical signal by performing photoelectric conversion, the event data occurring during an accumulation time from a frame generation start time to a frame generation end time;
setting and supplying a frame period indicating an interval between a frame data generation start time of first frame data and a frame data generation start time of second frame data to the frame data generation unit, the second frame data being generated consecutively with the first frame data;
setting and supplying the accumulation time to the frame data generation unit;
switching between setting the accumulation time on a basis of time and setting the accumulation time depending on a number of the event data in response to a user operation;
dividing a frame of the frame data into segmented regions; and
setting the accumulation time in units of the segmented regions based on a corresponding plurality of objects within the frame.

12. The data processing method according to claim 11, further comprising:
performing image processing using the first and second frame data.

13. The data processing method according to claim 12, wherein the image processing is recognition processing.

14. A data processing device, comprising:
a frame data generation unit configured to generate first frame data and second frame data in such a way that a first accumulation time and a second accumulation time overlap,
wherein the first frame data is based on event data indicating a variation in an electrical signal of a pixel generating the electrical signal by performing photoelectric conversion, the event data occurs during the first accumulation time from a first frame generation start time to a first frame generation end time, and the second frame data is based on the event data occurring during the second accumulation time from a second frame generation start time to a second frame generation end time; and
an accumulation time setting unit configured to set and supply the first accumulation time and the second accumulation time to the frame data generation unit,
wherein the accumulation time setting unit is further configured to switch between setting the first and second accumulation times on a basis of time and setting the first and second accumulation times depending on a number of the event data in response to a user operation, and
wherein the accumulation time setting unit sets the first and second accumulation times in units of segmented regions, the segmented regions obtained by dividing a frame of each of the first and second frame data into a plurality of regions, based on a corresponding plurality of objects within the frame.

15. The data processing device according to claim 14, further comprising:
an image processing unit configured to perform image processing using the first and second frame data.

16. The data processing device according to claim 15, wherein the image processing unit performs recognition processing on the first and second frame data.

17. A data processing method, comprising:
generating first frame data and second frame data in such a way that a first accumulation time and a second accumulation time overlap,
wherein the first frame data is based on event data indicating a variation in an electrical signal of a pixel generating the electrical signal by performing photoelectric conversion, the event data occurs during the first accumulation time from a first frame generation start time to a first frame generation end time, and the second frame data is based on the event data occurring during the second accumulation time from a second frame generation start time to a second frame generation end time;
switching between setting the first and second accumulation times on a basis of time and setting the first and second accumulation times depending on a number of the event data in response to a user operation;
dividing a frame of each of the first and second frame data into segmented regions; and
setting the first and second accumulation times in units of the segmented regions based on a corresponding plurality of objects within the frame.

18. The data processing method according to claim 17, further comprising:
generating third frame data based on event data occurring during a third accumulation time from a third frame generation start time to a third frame generation end time; and
setting a first frame period and a second frame period to be different from each other, the second frame period being a period from the second frame generation start time to the third frame generation start time.

19. The data processing method according to claim 17, further comprising:
setting a first accumulation time and the second accumulation time to be different from each other.

20. The data processing method according to claim 17, further comprising:
performing image processing using the first and second frame data.

21. The data processing method according to claim 20, wherein the image processing is recognition processing.

22. A data processing device, comprising:
a data processing unit including:
an event generation unit having a pixel generating an electrical signal by performing photoelectric conversion, configured to generate event data representing occurrence of an event indicating a variation in the electrical signal of the pixel;
a frame data generation unit configured to generate frame data on a basis of the event data occurring during an accumulation time from a frame generation start time to a frame generation end time;
a frame period setting unit configured to set and supply a frame period indicating an interval between a frame data generation start time of first frame data and a frame data generation start time of second frame data to the frame data generation unit, the second frame data being generated consecutively with the first frame data; and
an accumulation time setting unit configured to set and supply the accumulation time to the frame data generation unit, wherein the accumulation time setting unit is further configured to switch between setting the accumulation time on a basis of time and setting the accumulation time depending on a number of the event data in response to a user operation, and wherein the accumulation time setting unit sets the accumulation time in units of segmented regions, the segmented regions obtained by dividing a frame of the frame data into a plurality of regions, based on a corresponding plurality of objects within the frame.

23. The data processing device according to claim 22, further comprising:

an image processing unit configured to perform image processing using the frame data.

24. The data processing device according to claim 23, wherein the image processing unit performs recognition processing on the frame data.

25. The data processing device according to claim 22, wherein the data processing unit includes a semiconductor chip having a plurality dies arranged on top of each other.

26. A non-transitory computer readable medium that stores a program for causing a computer to function as:

a frame data generation unit configured to generate frame data on a basis of event data indicating a variation in an electrical signal of a pixel generating the electrical signal by performing photoelectric conversion, the event data occurring during an accumulation time from a frame generation start time to a frame generation end time;

a frame period setting unit configured to set and supply a frame period indicating an interval between a frame data generation start time of first frame data and a frame data generation start time of second frame data to the frame data generation unit, the second frame data being generated consecutively with the first frame data; and an accumulation time setting unit configured to set and supply the accumulation time to the frame data generation unit, wherein the accumulation time setting unit is further configured to switch between setting the accumulation time on a basis of time and setting the accumulation time depending on a number of the event data in response to a user operation, and wherein the accumulation time setting unit sets the accumulation time in units of segmented regions, the segmented regions obtained by dividing a frame of the frame data into a plurality of regions, based on a corresponding plurality of objects within the frame.

27. A non-transitory computer readable medium that stores a program for causing a computer to function as:

a frame data generation unit configured to generate first frame data and second frame data in such a way that a first accumulation time and a second accumulation time overlap, wherein the first frame data is based on event data indicating a variation in an electrical signal of a pixel generating the electrical signal by performing photoelectric conversion, the event data occurs during the first accumulation time from a first frame generation start time to a first frame generation end time, and the second frame data is based on the event data occurring during the second accumulation time from a second frame generation start time to a second frame generation end time; and an accumulation time setting unit configured to set and supply the first accumulation time and the second accumulation time to the frame data generation unit, wherein the accumulation time setting unit is further configured to switch between setting the first and second accumulation times on a basis of time and setting the first and second accumulation times depending on a number of the event data in response to a user operation, and wherein the accumulation time setting unit sets the first and second accumulation times in units of segmented regions, the segmented regions obtained by dividing a frame of each of the first and second frame data into a plurality of regions, based on a corresponding plurality of objects within the frame.

28. A data processing method, comprising:

generating event data representing occurrence of an event indicating a variation in an electrical signal of a pixel generating the electrical signal by performing photoelectric conversion;

generating, by a frame data generation unit, frame data on a basis of the event data occurring during an accumulation time from a frame generation start time to a frame generation end time;

setting and supplying a frame period indicating an interval between a frame data generation start time of first frame data and a frame data generation start time of second frame data to the frame data generation unit, the second frame data being generated consecutively with the first frame data;

setting and supplying the accumulation time to the frame data generation unit; and switching between setting the accumulation time on a basis of time and setting the accumulation time depending on a number of the event data in response to a user operation;

dividing a frame of the frame data into segmented regions; and setting the accumulation time in units of the segmented regions based on a corresponding plurality of objects within the frame.

* * * * *